(12) United States Patent
Ekeroth

(10) Patent No.: US 10,033,945 B2
(45) Date of Patent: Jul. 24, 2018

(54) ORIENTATION-ADAPTED IMAGE REMOTE INSPECTION SYSTEMS AND METHODS

(71) Applicant: FLIR SYSTEMS AB, Taby (SE)

(72) Inventor: Lucas Ekeroth, Stockholm (SE)

(73) Assignee: FLIR Systems AB, Taby (SE)

(*) Notice: Subject to any disclaimer, the term of this patent is extended or adjusted under 35 U.S.C. 154(b) by 434 days.

(21) Appl. No.: 14/568,048

(22) Filed: Dec. 11, 2014

(65) Prior Publication Data

US 2015/0172567 A1    Jun. 18, 2015

Related U.S. Application Data

(60) Provisional application No. 61/915,288, filed on Dec. 12, 2013.

(51) Int. Cl.
| | | |
|---|---|---|
| H04N 9/47 | (2006.01) | |
| H04N 7/18 | (2006.01) | |
| H04N 5/33 | (2006.01) | |
| H04N 5/262 | (2006.01) | |
| H04N 5/225 | (2006.01) | |

(52) U.S. Cl.
CPC .......... *H04N 5/332* (2013.01); *H04N 5/2258* (2013.01); *H04N 5/2628* (2013.01); *H04N 7/183* (2013.01)

(58) Field of Classification Search
CPC .............. H04N 2005/2255; H04N 7/183
See application file for complete search history.

(56) References Cited

U.S. PATENT DOCUMENTS

| | | | | |
|---|---|---|---|---|
| 7,892,165 B2* | 2/2011 | Nakamura | ............. | A61B 1/045 600/109 |
| 9,024,972 B1* | 5/2015 | Bronder | ............... | G06T 19/006 345/633 |
| 2005/0177054 A1* | 8/2005 | Yi | ......................... | A61B 5/055 600/510 |
| 2007/0265502 A1* | 11/2007 | Minosawa | ......... | A61B 1/00177 600/173 |
| 2008/0318595 A1* | 12/2008 | Rofougaran | .......... | G01S 13/426 455/456.1 |
| 2009/0137952 A1* | 5/2009 | Ramamurthy | .......... | A61B 5/06 604/95.01 |

* cited by examiner

*Primary Examiner* — Chikaodili E Anyikire
(74) *Attorney, Agent, or Firm* — Haynes and Boone, LLP

(57) ABSTRACT

A system and a method for generating orientation-adapted images in a remote inspection system are disclosed, wherein said remote inspection system comprises an image-capturing unit, an image-presenting unit, an orientation sensor, a processor, and an imaging system comprised in said image-capturing unit. The method comprises capturing an image of a real world scene, wherein said image comprises a frame of image data values, obtaining orientation data values from an orientation sensor, and generating an orientation-adapted image based on said image data values and said orientation data values.

18 Claims, 15 Drawing Sheets

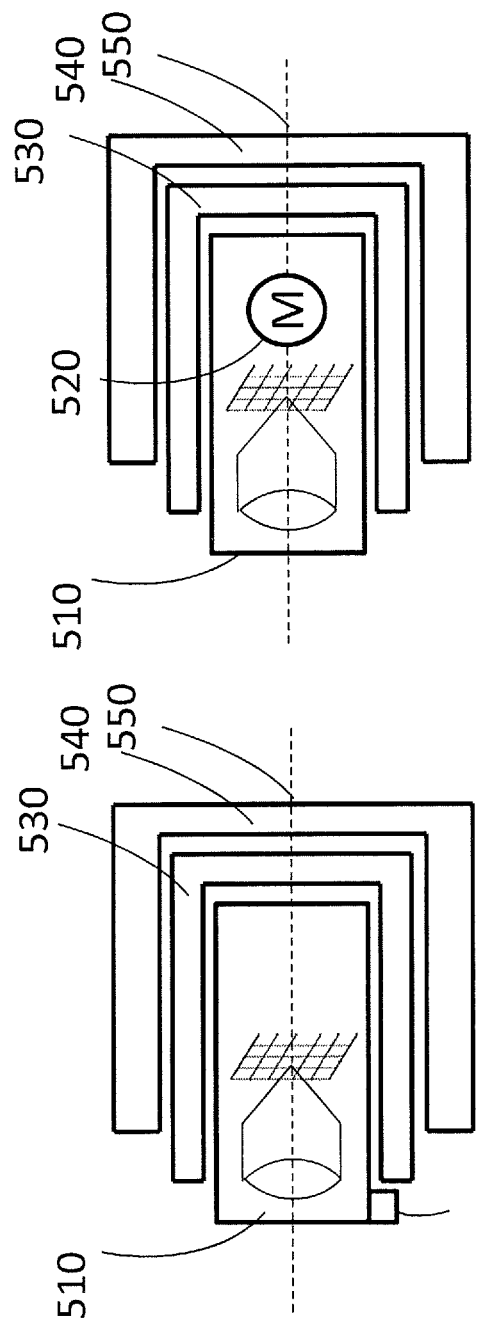

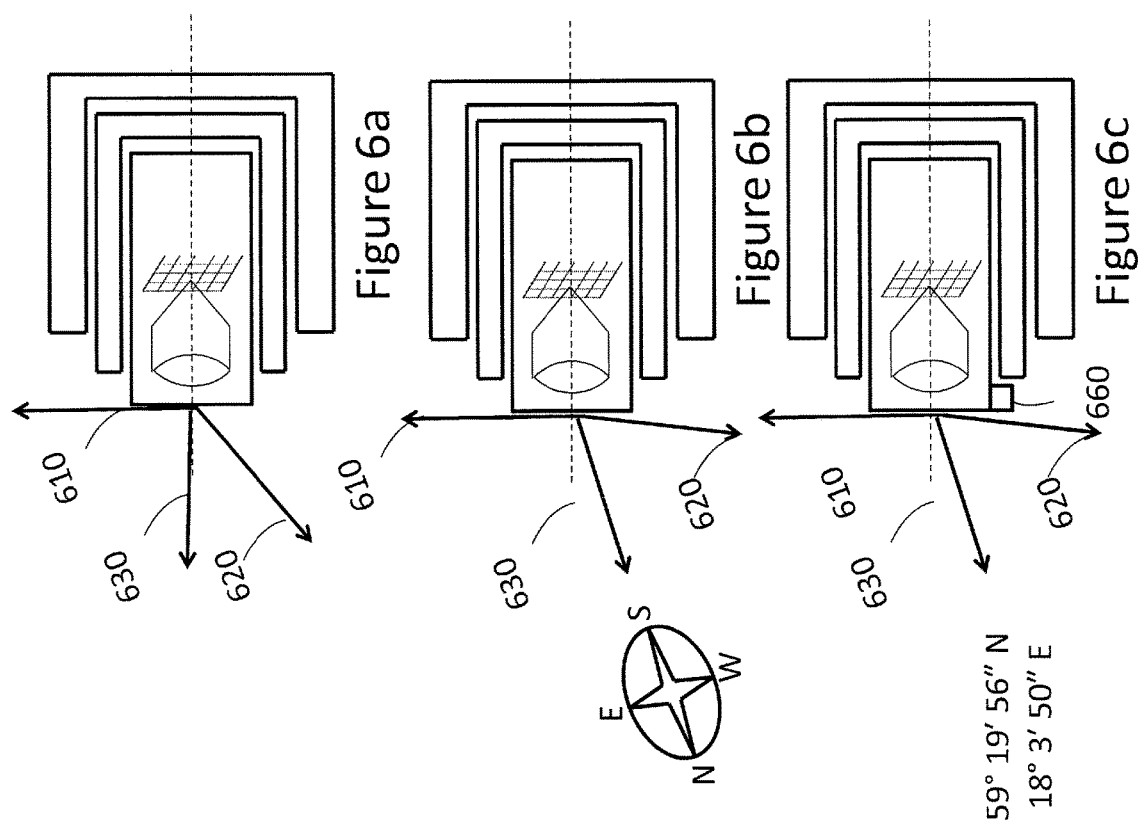

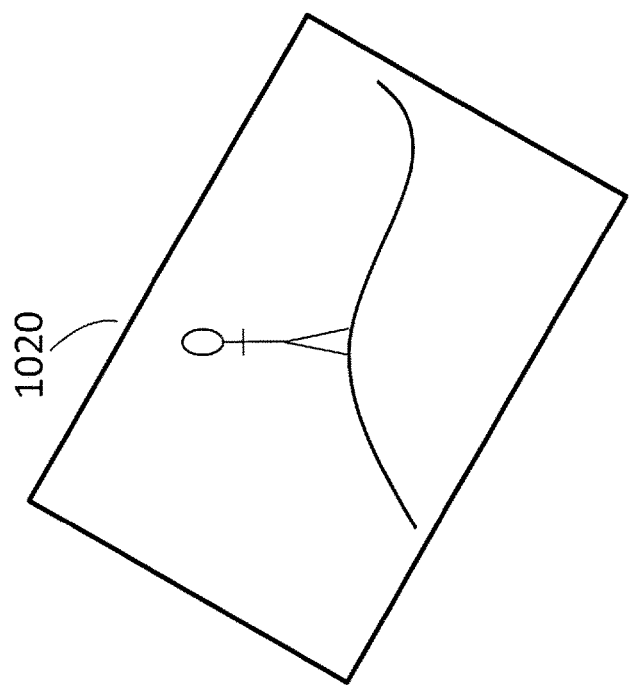
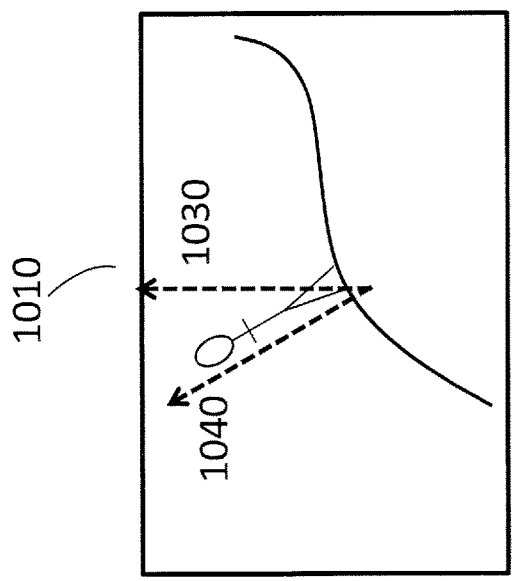
Figure 10

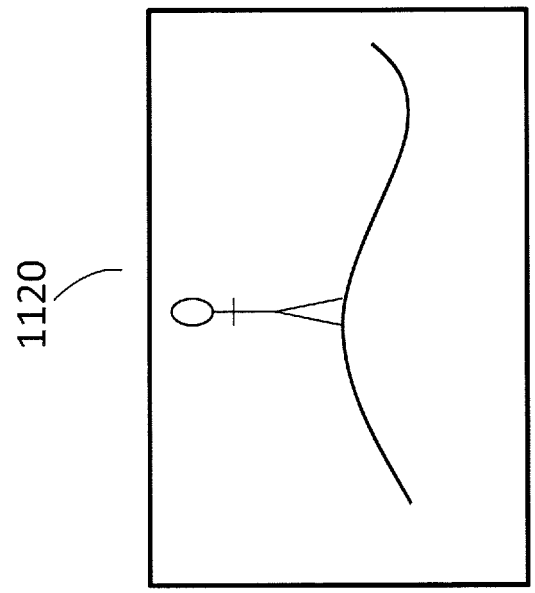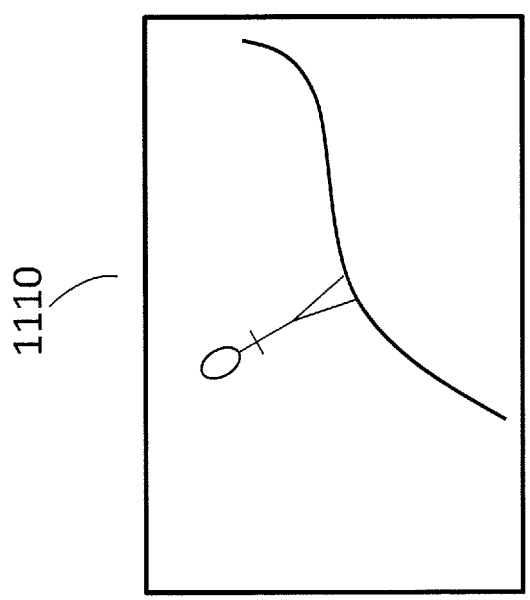
Figure 11

ORIENTATION-ADAPTED IMAGE REMOTE INSPECTION SYSTEMS AND METHODS

CROSS-REFERENCE TO RELATED APPLICATION

This application claims priority to and the benefit of U.S. Provisional Patent Application No. 61/915,288 filed Dec. 12, 2013 and entitled "ORIENTATION-ADAPTED IMAGE REMOTE INSPECTION SYSTEMS AND METHODS," which is hereby incorporated by reference in its entirety.

TECHNICAL FIELD

Generally, embodiments of the invention relate to the technical field of inspecting a scene with a remote inspection system that captures infrared (IR) and/or visible light (VL) image data.

More specifically, different embodiments of the present disclosure relate to a remote inspection system, comprising an image-capturing unit and an image-presenting unit physically separated and communicatively coupled, configured for generating orientation-adapted IR images.

BACKGROUND

Remote inspection systems, e.g. borescopes or boroscopes, are often useful for inspection, monitoring and/or maintenance purposes in confined spaces, where an image-capturing unit, such as a camera head, may be inserted into a confined space or area to be inspected that is inaccessible and an image-presenting unit, such as a display unit with a processor, remains in a location where a user of the remote inspection system may monitor a display presenting a visual representation of a generated image or to store a generated image to memory. Remote inspection systems may be configured with an image-capturing unit and an image-presenting unit attached by a rigid or flexible tube or arm and may therefore be divided into two different groups, rigid and flexible, where the first group is applied to inspect confined spaces in a straight line, because the tube is straight and rigid. A flexible borescope on the other hand can move around in confined spaces, e.g. by the ability to control the direction of the end part of the tube or arm comprising the image-capturing unit.

One of the problems of conventional systems is that an remote inspection system with a flexible tube or arm allows the image-capturing unit to be oriented in an arbitrary direction and with an arbitrary rotation thereby severely affecting the users understanding of a generated image, e.g. when making a 180 degree turn or rotation of, the image-capturing unit within a confined space. The same problem might occur when the image-presenting unit is rotated, e.g. when suspended in a non-rigid arrangement, such as hanging in a strap attached to a hook. This might be the case when a user or operator of the remote inspection system requires both hands to operate the image-capturing unit via said tube or arm.

SUMMARY

Various techniques are disclosed for systems and methods which generate orientation-adapted images, thereby improving the user's understanding of the generated image. Techniques are further disclosed for systems and methods that provide improved three dimensional 3D navigation of the image-capturing unit, e.g. to return to a previous visited location based on historical movements of the image-capturing unit, by generating orientation-adapted images.

For example, such techniques may include configuring the image-capturing unit, such as a camera head, to include an orientation sensor and providing the image-presenting unit with a processor, comprising computer program code portions configured to direct the processor to perform various operations and functions of the disclosure, and optionally an orientation sensor.

In one embodiment, an orientation-adapted image may be generated by rendering and overlaying orientation data values obtained from an orientation sensor onto an image captured by said image-capturing unit as an orientation-adapted image.

In another embodiment an orientation-adapted image may be generated by physically rotating parts of the image-capturing unit or the image-presenting unit based on orientation data values, such as the entire image-capturing unit, an image detector of the image-capturing unit, the entire image-presenting unit or just a display of the image-presenting unit.

In yet another embodiment an orientation-adapted image may be generated by image processing a captured image based on orientation data values from an orientation sensor, e.g. by applying rotation transformation, scaling transformation, cropping, and/or area selection. Rotation transformation could conceptually be described as applying a reference coordinate system, e.g. the coordinate system of the user's eyes, onto the generated image, or simply that the user is given the impression that his eyes are at the location of the image-capturing unit.

BRIEF DESCRIPTION OF DRAWINGS

Embodiments of the invention will now be described in more detail with reference to the appended drawings, wherein:

FIG. 5a shows a schematic view of an embodiment of the disclosure, wherein said image-capturing unit further comprises a leveling weight operably attached to said imaging system, wherein said leveling weight has a center of mass displaced from an axis of the imaging system such that gravitational forces rotate or maintain the rotational orientation of the imaging system independent of the orientation of a housing of the imaging system and/or align the direction of gravity with a calibrated vertical or up/down orientation of the imaging system.

FIG. 5b shows a schematic view of an embodiment of the disclosure, wherein said image-capturing unit comprises an image-capturing unit servo motor configured to be in contact with said imaging system, to receive a control signal and to rotate said imaging system in relation to a housing of the imaging system to minimize a vertical rotation offset of an imaging system coordinate system to a reference coordinate system.

FIG. 6a illustrates an imaging system coordinate system in accordance with an embodiment of the disclosure, wherein said imaging system coordinate system comprises a'y-axis representing a vertical or up/down orientation and a horizontal plane orthogonal to the y-axis, wherein said horizontal plane comprises an x-axis representing horizontal or left/right orientation and a z-axis representing a directional orientation.

FIG. 6b illustrates an imaging system coordinate system in accordance with another embodiment of the disclosure, wherein said imaging system coordinate system comprises a y-axis representing a vertical or up/down orientation and a horizontal plane orthogonal to the y-axis, wherein said horizontal plane comprises an x-axis representing horizontal or left/right orientation and a z-axis representing a directional orientation as a magnetic compass direction.

FIG. 6c illustrates an imaging system coordinate system in accordance with another embodiment of the disclosure, wherein said imaging system coordinate system comprises a y-axis representing a vertical or up/down orientation and a horizontal plane orthogonal to the y-axis, wherein said horizontal plane comprises an x-axis representing horizontal or left/right orientation and a z-axis representing a directional orientation as direction to a target location to which the user is trying to navigate the image-capturing unit.

FIG. 10 illustrates how a display system is rotated by an image-presenting unit servo motor to minimize said vertical rotation offset, in accordance with an embodiment of the disclosure.

FIG. 11 illustrates an example of an orientation-adapted image that is generated by image processing based on a captured image and orientation data values, in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
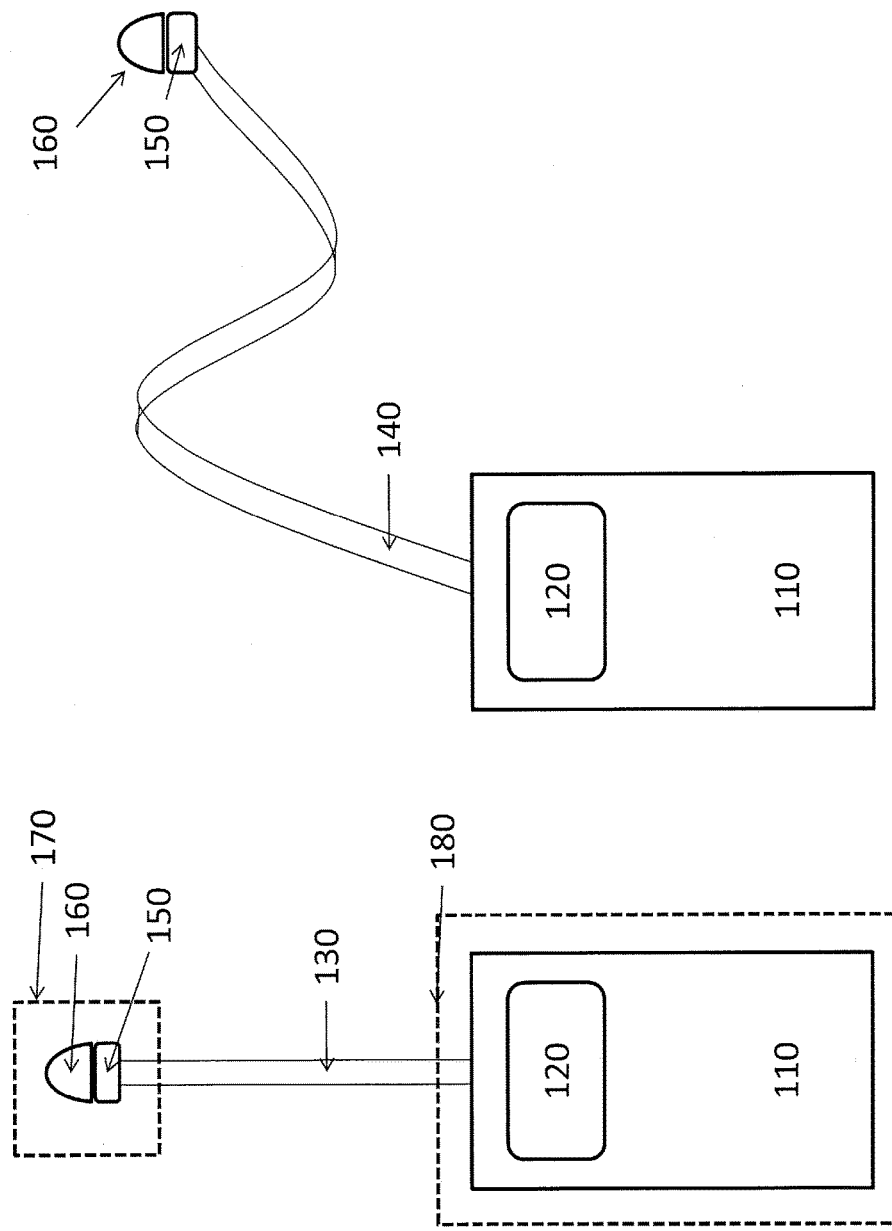
FIG. 1 shows a schematic view of a remote inspection system comprising an image-capturing unit and an image-presenting unit in accordance with an embodiment of the disclosure.

Introduction
Remote Inspection System.

Remote inspection systems, borescopes, or boroscopes, such as video boroscopes, IR boroscopes, or IR cameras comprising an IR imaging system, are often used for inspection, monitoring, and/or maintenance purposes in confined spaces, where an image-capturing unit, such as a camera head, may be inserted into a confined space or area to be inspected that is inaccessible and an image-presenting unit, such as a display unit with a processor, remains in a location where a user of the remote inspection system may monitor a display presenting a visual representation of a generated image or to store a generated image to memory. Remote inspection systems may have the image-capturing unit and an image-presenting unit attached by a rigid or flexible tube or arm and may therefore be divided into two different groups, rigid and flexible, where the first group is applied to inspect confined spaces in a straight line. A flexible boroscope on the other hand can move around in confined spaces, e.g. by the ability to control the direction of the end part of the tube or arm comprising the image-capturing unit. A more detailed description of a remote inspection system is discussed in relation to FIG. 2. In one or more embodiments, said remote inspection system may comprise a visible light (VL) imaging system and/or an infrared (IR) imaging system. Visible light (VL) may also be referred to as visual light (VL).

Capturing.

Remote inspection systems comprise an image-capturing unit further configured with an imaging system configured to capture an image, as a frame of image data values, of a view of an observed real world scene. The view is also referred to as the field of view (FOV) of the imaging system. Imaging systems generally employ a lens or an optical system configured to operate with a corresponding detector to provide an image of a view of an observed real world scene. An example of the operation of such optical imaging systems are generally as follows: electromagnetic radiation, e.g. VL or IR, is accepted via an optical system, including the lens, and directed onto detector elements. Each detector element responds to the electromagnetic radiation or energy received. A frame of image data values may, for example, be captured by scanning all the rows and columns of a detector and, in some embodiments, analog to digital converted, to obtain a captured image. Image data values associated with each detector element is referred to as an image pixel in the image, having an associated row and column index. In one or more embodiments, the imaging system is configured to provide a captured image as a frame of image data values to a processor, communicatively coupled to said imaging system. In one or more embodiments, the imaging system might be adapted to store the image as a frame of image data values in a memory or intermediate storage, such as a frame buffer, before providing said image to a processor.

In one or more embodiments, said imaging systems comprised in said imaging device are configured to capture an VL image as VL image data values substantially simultaneously with said an IR image as IR image data values.

In one or more embodiments, said substantially simultaneously captured VL image and IR image are associated as associated images by an indicia represented by a data structure.

In one or more embodiments, a combined image is generated based on said VL image and said IR image by performing image processing operations, e.g. image fusion.

In one or more embodiments, images comprising image data values, such as VL images or IR images, are consecutively and repeatedly captured at a constant frame rate as video frames.

A video frame comprises a series of images captured in rapid consecutive succession at a constant frame rate. It can also be explained as multiple consecutive captured images as a stream of images. The video frames are represented by vectors of image data values based on analog or digital signals. Said constant frame rate in which images are captured may vary depending on desired output and user experience. The frame rate may be measured by a number of frames per second, also called frame frequency.

Calibration.

Certain characteristics of radiation detectors in an imaging system cause measurement errors. Individual detector elements have unique response characteristics. These response characteristics are found to produce non-uniformities, which result in noise. Additionally, heat generated internally by the remote inspection system and the environment surrounding the thermal remote inspection system causes temperature drifts which cause offsets in the captured data values compared with radiation emitted from the observed real world scene. Many remote inspection systems have functionality to correct for such non-uniformities and temperature drifts.

In one or more embodiments, such functionality may be referred to herein as IR temperature calibration. For example, remote inspection systems may automatically or manually perform offset compensation/IR temperature calibration, which corrects for such non-uniformities and temperature drifts by observing a uniform IR or thermal scene. More specifically for one example, performing non-uniformity and/or temperature drift correction may include placing a shutter between the optics and the detector elements, measuring offset correction data for each detector element which provides the desired uniform output response, and obtaining a reading of the surrounding environment (e.g., measuring the ambient temperature). These measured non-uniformities offset corrections values and temperature drift offset correction values, herein referred to as IR temperature calibration data parameters, may be stored and later applied in subsequent infrared measurements, when analyzing or interpreting the IR image data values (also referred to as IR image values) to correct for the measurement errors described above.

System Architecture

Remote Inspection System.

FIG. 1 shows a schematic view of an embodiment of the disclosure illustrating a remote inspection system comprising an image-capturing unit 170 and an image-presenting unit 180. In one or more embodiments, said image-capturing unit 170 comprises an imaging system 160. In one or more embodiments, said image-presenting unit 180 comprises a display system 120. In one or more embodiments, said remote inspection system further comprises an orientation sensor 150. In one or more embodiments, said orientation sensor 150 is comprised in said imaging system 160 and/or in said display system 120.

In one or more embodiments, the remote inspection system comprises a processor unit 110 (e.g., a processor, microcontroller, or other circuit or integrated circuit capable of executing instructions to perform various processing operations) configured with code portions configured to direct the processor unit 110 to perform the steps and functions of the required operations as calculations and data handling, e.g. IR and/or VL image data values, video frames and orientation sensor values, coming from the image-capturing system 160 and orientation sensor 150.

In one or more embodiments, the remote inspection system may comprise a rigid tube 130 and/or a flexible tube 140 to cover various needs during inspection work in confined spaces. In one or more embodiments, the remote the rigid tube 130 and/or flexible tube 140 may be configured to connect the image-capturing unit 170 and the image-presenting unit 180 while setting them off at a distance from each other. These embodiments may allow the image-capturing unit 170 at one end of the rigid tube 130 and/or the flexible tube 140 to reach hard-to-reach places, thereby covering the various needs in the work required during inspections in confined spaces. The rigid tube 130 tube and the flexible tube 140 may be of varying length and/or varying materials depending on manufacturing instructions or user preferences.

In one or more embodiments, the remote inspection system is adapted to be a handheld type remote inspection system or a fixed-mounted monitoring type remote inspection system.

Figure 2:
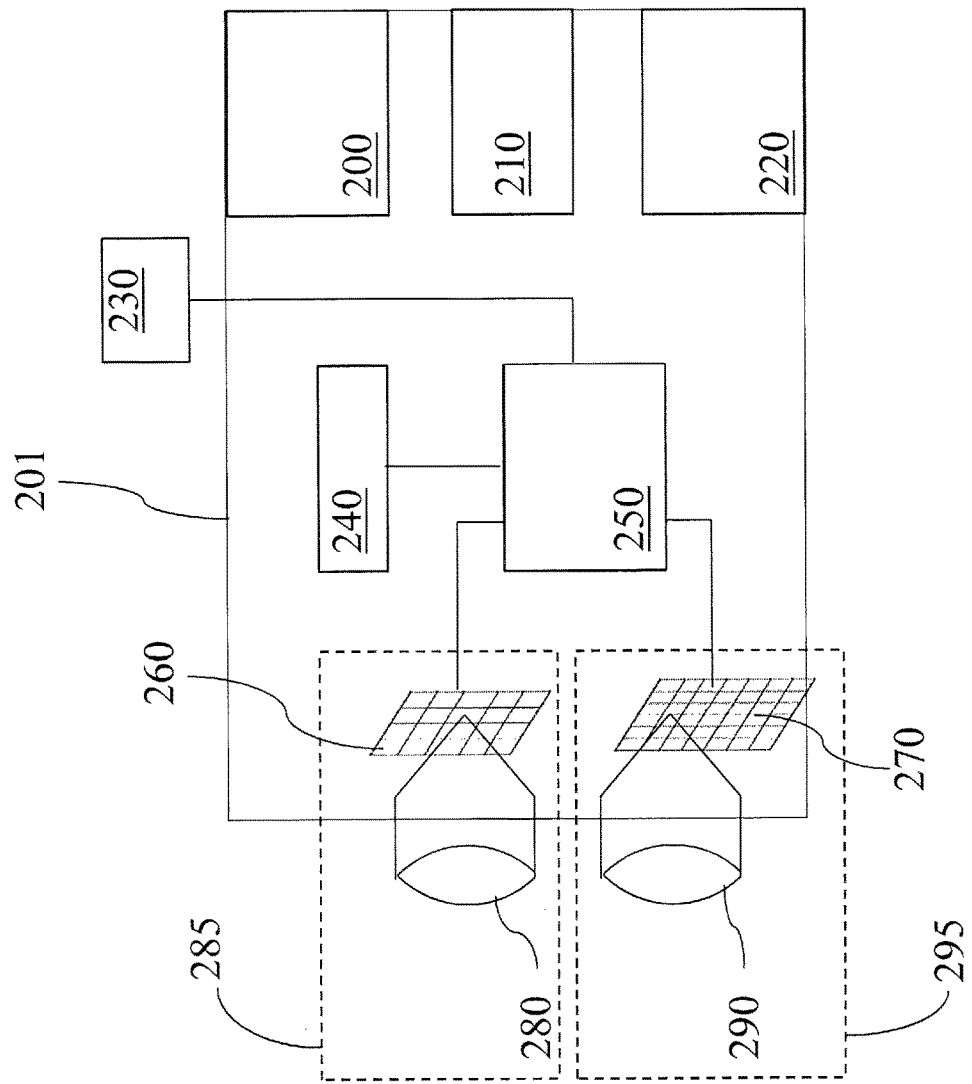
FIG. 2 shows a schematic view of a remote inspection system in accordance with an embodiment of the disclosure.

Various components of the remote inspection system of FIG. 1 may be implemented in a similar or same manner as the corresponding components described for FIG. 2 where applicable.

FIG. 2 shows a schematic view of a remote inspection system 201 according to embodiments of the disclosure, e.g. in the form of a thermography arrangement or an infrared IR camera that is configured to capture infrared (IR) image data values, representing infrared radiation emitted from a scene by an infrared (IR) imaging system 285. Said IR imaging system employ an infrared (IR) optical system 280, e.g. comprising a lens, zoom functionality and focus functionality together with a corresponding IR detector 260, for example comprising a micro-bolometer focal plane array, to provide an IR image in the form of a signal frame of IR image data values, representing infrared radiation emitted from a scene.

The infrared (IR) imaging system 285 is further arranged to send the signal frame of IR image data values to a processor unit 250. The remote inspection system 201 further comprises the processor unit 250, provided with specifically designed programming or program code portions adapted to control the processor unit 250 to perform the operations and functions of embodiments of various methods described herein. The remote inspection system 201 further comprises at least one memory 240 configured to store data values or parameters received from the processor unit 250 or to retrieve and send image data values or parameters to the processor unit 250.

The remote inspection system 201 further comprises a communications interface configured to send or receive image data values or parameters to/from the processor unit 250 to/from external units via a communications interface 200. In one or more embodiments, said external unit may be a computing device 330 described in connection with FIG. 3.

In one or more embodiments, said IR imaging system 285 comprised in said remote inspection system 201 is configured to capture multiple consecutive IR images as a stream of IR images, such as a video with a given frame rate.

An exemplary embodiment of the operation of such a remote inspection system, such as an IR camera, is generally as follows: Infrared energy is accepted via said infrared optical system 280 and directed onto the IR detector elements 260. Each detector element responds to the infrared radiation or heat energy received. A frame of infrared (IR) image data values may, for example, be captured by scanning all the rows and columns of the detector and, in some embodiments, analog to digital converted to obtain a captured IR image wherein image data values associated to each detector element is referred to as an IR image data value having an associated row and column index.

In one or more embodiments, the remote inspection system 201 may further comprise a visible light (VL) imaging system 295 that is configured to capture visible light (VL) image data values, representing VL emitted from a scene. Said VL imaging system employ an visible light (VL) optical system 290, e.g. comprising a lens, zoom functionality and focus functionality together with a corresponding VL detector 270, for example comprising a digital charge-coupled device (CCD) or complementary metal-oxide-semiconductor (CMOS) active pixel sensors, to provide an VL image in the form of a signal frame of VL image data values, representing VL emitted from a scene. The VL imaging system 295 is further arranged to send the signal frame of VL image data values to the processor unit 250.

In one or more embodiments, the VL imaging system 295 may be adapted to capture electromagnetic radiation in other non-thermal wavelengths in addition to or in place of visible light wavelengths. For example, the VL imaging system 295 may be configured to capture near-infrared (NIR) light, short wave infrared (SWIR) light, ultra-violet (UV) light, or other non-thermal light in addition to or in place of visible light. For such embodiments, the VL imaging system 295 may represent a non-thermal imaging system comprising a non-thermal optical system (represented by the VL optical system 290) and a non-thermal detector (represented by the VL detector 270) responsive to non-thermal radiation. For example, electron multiplying CCD (EMCCD) sensors, scientific CMOS (sCMOS) sensors, intensified charge-coupled device (ICCD) sensors, as well as CCD-based and CMOS-based sensors discussed above and/or other suitable sensors, may be used to implement the non-thermal detector (represented by the VL detector 270) to detect NIR light, SWIR light, and/or other non-thermal light.

In one or more embodiments, said VL imaging system 295 comprised in said remote inspection system 201 is configured to capture multiple consecutive VL images as a stream of VL images, such as a video with a given frame rate.

In one or more embodiments, the IR imaging system 285 and/or VL imaging system 295 may be provided in an image-capturing unit or camera head, such as for example in the image generating unit 170 of the remote inspection of FIG. 1.

In one or more embodiments, the remote inspection system 201 further comprises a display 220 configured to receive a signal from the processor unit 250 and to display the received signal as an orientation-adapted image, e.g. to a user of the remote inspection system 201. In one or more embodiments, the display 220 may be provided in an image-presenting unit, such as for example in the image-presenting unit 180 of the remote inspection system of FIG. 1.

In one or more embodiments, the remote inspection system 201 further comprises a user input device 210 configured to receive user input signals or indications from a user.

In one or more embodiments, the remote inspection system 201 is configured as one system in which the IR imaging system 285 and the VL imaging system 295 are integrated.

In one or more embodiments, the remote inspection system 201 is configured as two physically separate systems, i.e. a first system comprising a IR imaging system 285 and second system comprising a VL imaging system 295, communicatively coupled and depicting, or capturing, substantially the same scene. A memory 240 may be integrated into either one or the first or second system or a memory 240 may be integrated in a physically separate memory device 230 to which said first and second system is communicatively coupled.

In one or more embodiments, the remote inspection system 201 is configured to capture infrared (IR) image data values, representing infrared radiation emitted from a scene and then further to correct or calibrate captured image data values by applying pre-determined IR temperature calibration data parameters, to map and scale the captured image data values for display as an IR, or thermal, image, singly or combined with a VL image, according to methods known in the art.

In one or more embodiments, the IR imaging system 285 comprised in the remote inspection system 201 is further arranged to send the signal frame of IR image data values to the processor unit 250 for intermediate storing in a memory comprised in or separate from the remote inspection system 201.

In one or more embodiments, the IR imaging system 285 comprised in the remote inspection system 201 is further arranged to send the signal frame of IR image data values to an external processor unit (not shown in FIG. 2) from said intermediate storing via said communications interface 200.

In one or more embodiments, the processor unit 250 comprised in the remote inspection system 201 is further arranged to send the received IR image as a signal frame of IR image data values to a an external processor unit (not shown in FIG. 2) directly or from said intermediate storing via said communications interface 200.

In one or more embodiments, the processor unit 250 may be a processor such as a general or specific purpose processor unit for example a microprocessor, microcontroller or other control logic that comprises sections of code or code portions, stored on a computer readable storage medium, such as the memory 240, that are fixed to perform certain tasks but also other alterable sections of code, stored on a computer readable storage medium, that can be altered during use. Such alterable sections of code can comprise parameters that are to be used as input for the various tasks, such as the calibration of the remote inspection system 201, adaption of the sample rate or the filter for the spatial filtering of the images, or any other parameter related operations known to a person skilled in the art.

In one or more embodiments, the processor unit 250 is configurable using a hardware description language (HDL).

In one or more embodiments, the processor unit 250 is a field-programmable gate array (FPGA), i.e. an integrated circuit designed to be configured by the customer or designer after manufacturing and configurable using a hardware description language (HDL). For this purpose, embodiments of the disclosure may comprise configuration data configured to control an FPGA to perform the operations and functions of the method embodiments described herein.

In this document, the terms "computer program product" and "computer-readable storage medium" may be used generally to refer to media such as the memory 240 or the storage medium of processing unit 250 or an external storage medium. These and other forms of computer-readable storage media may be used to provide instructions to processing unit 250 for execution. Such instructions, generally referred to as "computer program code" (which may be grouped in the form of computer programs or other groupings), when executed, enable the remote inspection system 201 to perform features or functions of embodiments of the disclosure. Further, as used herein, "logic" may include hardware, software, firmware, or a combination of thereof.

In one or more embodiments, said communications interface 200 may comprise a selection of GSM, General Packet Radio Service (GPRS), Enhanced Digital GSM Evolution (EDGE), Evolution of GSM (E-GSM). Code Division Multiple Access (CDMA), Wideband Code Division Multiple Access (WCDMA or W-CDMA), Orthogonal Frequency Division Multiple Access (OFDM), Time Division Multiple Access (TDMA), IEEE 802.xx family, Digital European Cordless Telecommunication (DECT), Infrared (IR), Wireless Fidelity (Wi-Fi™), Bluetooth™, and other standardized as well as non-standardized systems.

In one or more embodiments, the processor unit 250 is communicatively coupled and communicates with the memory 240 where parameters are kept ready for use by the processor unit 250, and where the images being processed by the processor unit 250 can be stored if the user desires. The one or more memories 240 may comprise a selection of a hard RAM, disk drive, a floppy disk drive, a magnetic tape drive, an optical disk drive, a CD or DVD drive (R or RW), or other removable or fixed media drive.

In one or more embodiments, the display 220 is integrated with the user input device 210 configured to receive user input signals or indications from a user.

Figure 3:
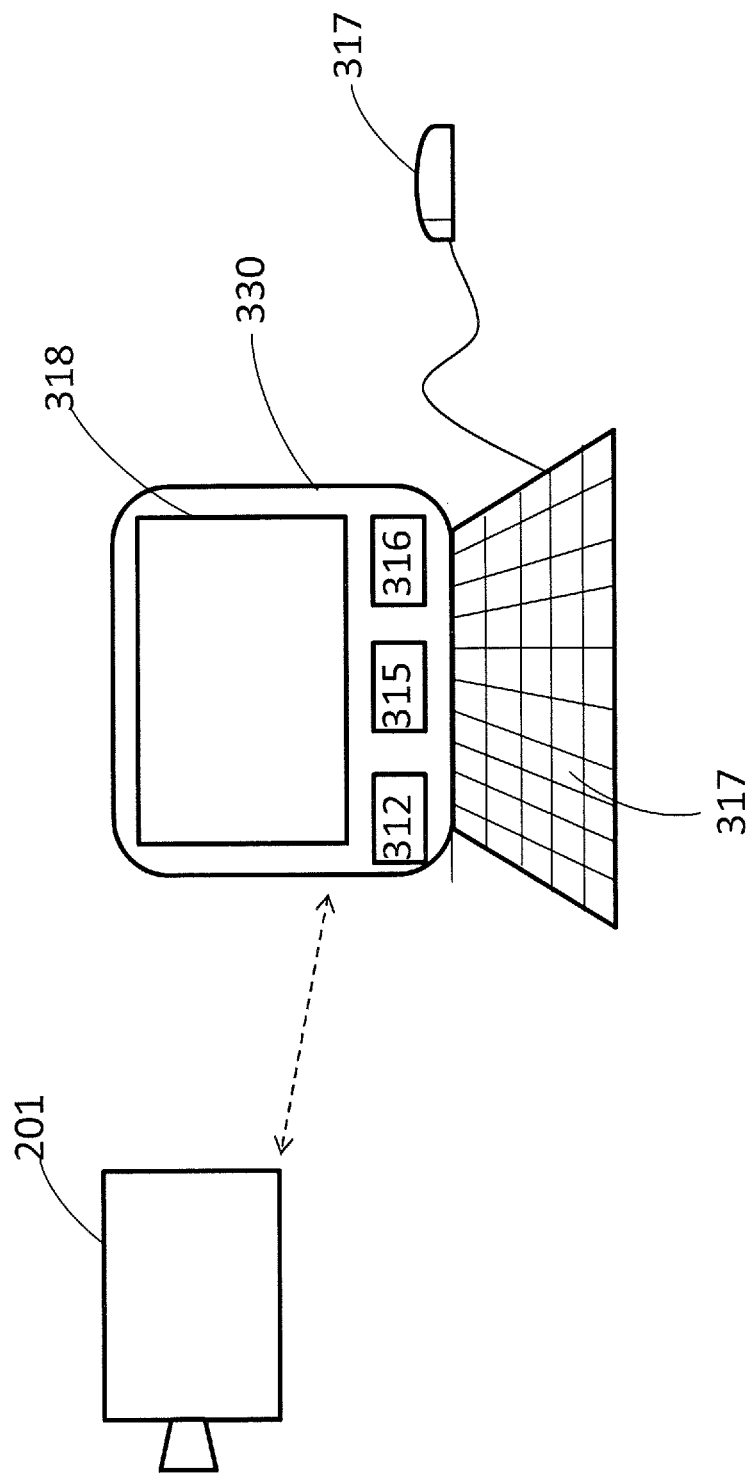
FIG. 3 shows a schematic view of an embodiment of the disclosure wherein an external computing device is configured to generate orientation-adapted images based on images captured by a remote inspection system.

FIG. 3 is a schematic view of one or more embodiments of the disclosure, wherein the processor unit 250 comprised in the thermal remote inspection system 201 is further arranged to send the captured image or orientation-adapted image as a signal frame of image data values to a an external processor/processing unit 312, wherein said external processor/processing unit 312 is comprised in a computing device 330 such as a tablet computer, a laptop, PDA, smartphone, mobile phone, cellular communications device or a desktop computer.

Said external processor/processing unit 312 is further arranged to receive said image as a signal frame of image data values via a communications interface 316, e.g. from processor unit 250. The external processor/processing unit 312 is provided with specifically designed programming or program code portions adapted to control the external processing unit 312 to perform various operations and functions of embodiments of the methods described herein. The computing device 330 further comprises a user input device 317 configured to receive input or indications from a user and a display 318 configured to receive a display signal from said external processor/processing unit 312 and to display the received signal as a displayed image, e.g. to a user of the computing device 330.

The computing device 330 further comprises at least one memory 315 configured to store data values or parameters received from the processor 312 or to retrieve and send data values or parameters to the processor 312. The computing device 330 further comprises the communications interface 316 configured to send or receive data values or parameters to/from the processor 312 from/to other devices, such as said thermal remote inspection system 201, via the communications interface 316. In one or more embodiments, the display 318 is integrated with a user input device 317 configured to receive input or indications from a user, e.g. by applying touch screen functionality and to send a user input signal to said processor/processing unit 312.

In one or more embodiments, the user input device 317 comprised or communicatively coupled to said computing device 330 is configured to receive input or indications from a user by applying eye tracking techniques, in manners known per se (e.g., in one or more conventional ways as would be understood by one skilled in the art).

In one or more embodiments, the user input device is configured to enable control functionality of the computing device 330 and/or the thermal remote inspection system 201. Obtaining Orientation Data Values from an Orientation Sensor.

In one or more embodiments, orientation data values are obtained from an orientation sensor configured to provide orientation data values in one, two, or three dimensions. In one or more embodiments, said orientation sensor is configured to provide said orientation data values to a processor in said remote inspection system communicatively coupled to said orientation sensor.

Figure 4B:
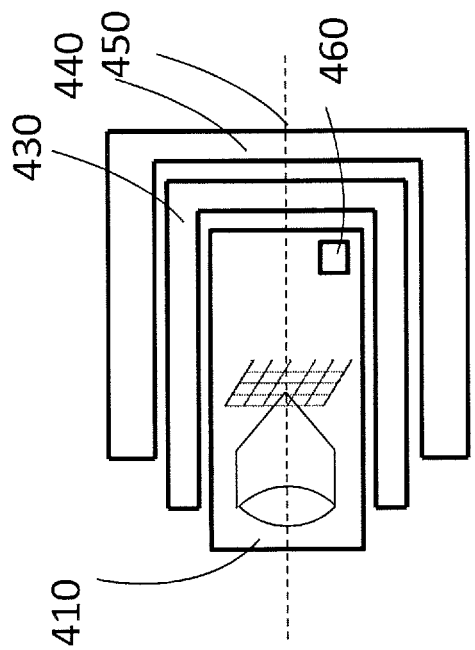
FIG. 4b shows a schematic view of an embodiment of the disclosure, wherein an orientation sensor is comprised in said imaging system.
Figure 4A:
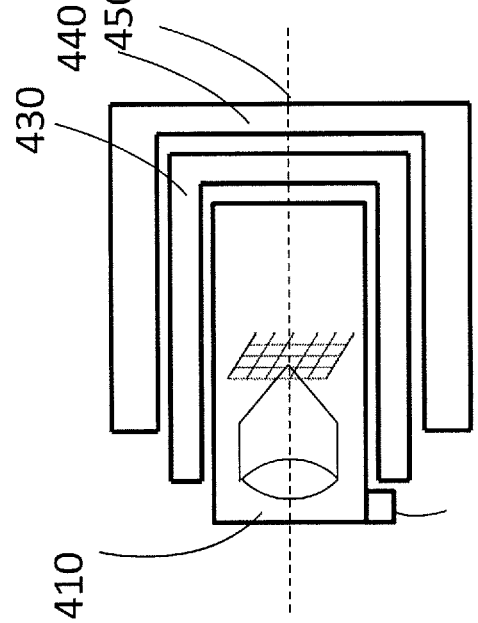
FIG. 4a shows a schematic view of an embodiment of the disclosure, wherein an orientation sensor is operably attached to said imaging system.

FIG. 4a shows a schematic view of an embodiment of the disclosure, wherein said image-capturing unit 170 comprises an imaging system 410. In this embodiment, an orientation sensor 460 (e.g., orientation sensor 150) is operably attached to said imaging system 410. In another embodiment, said image-capturing unit 170 further comprises an imaging system housing 440 for enclosing said imaging system 410. In yet another embodiment, said image-capturing unit 170 further comprises a slip ring 430 positioned or located between the imaging system 410 and the imaging system housing 440, wherein the imaging system 410 is freely rotatable within the housing 440 about an axis 450. In yet another embodiment, said axis 450 corresponds to an optical axis of the imaging system 410.

FIG. 4b shows a schematic view of another embodiment of the disclosure, wherein said image-capturing unit 170 comprises the imaging system 410. In this embodiment, said orientation sensor 460 is comprised in said imaging system 410. In another embodiment, said image-capturing unit 170 further comprises the imaging system housing 440 for enclosing said imaging system 410. In yet another embodiment, said image-capturing unit 170 further comprises the slip ring 430 positioned or located between the imaging system 410 and the imaging system housing 440, wherein the imaging system 410 is freely rotatable within the housing 440 about the axis 450. In yet another embodiment, said axis 450 corresponds to an optical axis of the imaging system 410.

In one or more embodiments, orientation data values are obtained from a selection of an orientation sensor comprised in or operably attached to said image-capturing unit 170, a second orientation sensor located in said image-presenting unit 180, and/or a third orientation sensor attached to the users body, e.g. the head, thereby obtaining the orientation of the users body, e.g. the tilting of the users head in an arbitrary direction.

In one or more embodiments, said orientation sensor 460 is configured as a selection of one or more of a Global Positioning System (GPS) sensor, a magnetic compass sensor, a tilt sensor, an inclinometer, and an accelerometer.

FIG. 5a shows a schematic view of an embodiment of the disclosure, wherein said image-capturing unit 170 comprises an imaging system 510. In this embodiment, said image-capturing unit 170 further comprises an imaging system housing 540 for enclosing said imaging system 510. In another embodiment, said image-capturing unit 170 further comprises a slip ring 530 positioned or located between the imaging system 510 and the imaging system housing 540, wherein the imaging system 510 is freely rotatable within the housing 540 about an axis 550. In yet another embodiment, said axis 550 corresponds to an optical axis of the imaging system 510. In yet another embodiment, said image-capturing unit 170 further comprises a leveling weight 580 operably attached to said imaging system 510, wherein said leveling weight 580 has a center of mass displaced from said axis 550 such that gravitational forces rotate or maintain the rotational orientation of the imaging system 510 independent of the orientation of the imaging system housing 540. In yet another embodiment, said leveling weight 580 is operably attached to said imaging system 510 to align the direction of gravity with a calibrated vertical or up/down orientation (further described herein) of the imaging system 510.

FIG. 5b shows a schematic view of another embodiment of the disclosure, wherein said image-capturing unit 170 comprises the imaging system 510. In this embodiment, said image-capturing unit 170 comprises an image-capturing unit servo motor 520 configured to be in contact with said imaging system housing 540 and said imaging system 510, to receive a control signal and to rotate said imaging system 510 in relation to said system housing 540 to minimize a vertical rotation offset of an imaging system coordinate system to a reference coordinate system. The imaging system coordinate system and reference coordinate system are further described below.

Coordinate Systems.

A coordinate system may be described as a system which uses one or more coordinates, to uniquely determine the position of a point or other geometric element on a manifold In particular a coordinate system may be particularly useful for describing translations or rotations of points or vectors, such as an axis.

In one or more embodiments, said imaging system coordinate system comprises a y-axis representing a vertical or up/down orientation of an imaging system (e.g., imaging system 160, imaging system 410, imaging system 510, IR imaging system 285, or VL imaging system 295) and intersects the optical axis of the imaging system. In one non-limiting example, this may be defined as an axis aligned with the vertical orientation of elements of the IR detector 260 and intersecting the center of the IR detector 260, which normally is intersected by an optical axis of the imaging system. In yet another embodiment, said imaging system coordinate system further comprises a horizontal plane orthogonal to the y-axis, wherein said horizontal plane further comprises an x-axis representing horizontal or left/right orientation and a directional orientation as a z-axis. In one or more embodiments, the origo or the intersecting point of said x-axis, said y-axis, and said z-axis is located on the optical axis of the imaging system and may be translated along said optical axis using a transform.

In one or more embodiments, said reference system coordinate system comprises a y-axis representing a vertical or up/down orientation, e.g. the direction of gravity, and intersects an optical axis of the imaging system. In yet another embodiment, said reference system coordinate system further comprises a horizontal plane orthogonal to the y-axis, wherein said horizontal plane further comprises an x-axis representing horizontal or left/right orientation and a directional orientation as a z-axis. In one or more embodiments, the origo or the intersecting point of said x-axis, said y-axis and said z-axis is located on an optical axis of the imaging system and may be translated along said optical axis using a transform.

In one or more embodiments, wherein said imaging system coordinate system and said reference system coordinate system In one or more embodiments, a vertical rotation offset is determined as a rotation of the rotational orientation y-axis of the imaging system in relation to the y-axis of the reference coordinate system. In yet another embodiment, the rotation is around an optical axis of the imaging system.

In one or more embodiments, the vertical rotation offset is further determined by performing translation of said imaging system coordinate system and said reference system coordinate system to the same origin so that the axes of said imaging system coordinate system and said reference system coordinate system intersect.

FIG. 6a illustrates an example of said imaging system coordinate system according to an embodiment of the disclosure. Said imaging system coordinate system comprises a y-axis 610 representing a vertical or up/down orientation, e.g. the direction of gravity, and a horizontal plane orthogonal to the y-axis, wherein said horizontal plane further comprises an x-axis 620 representing horizontal or left/right orientation and a z-axis 630 representing a directional orientation, wherein said z-axis represents the direction of an optical axis of the imaging system.

FIG. 6b illustrates an example of said imaging system coordinate system according to another embodiment of the disclosure. In this embodiment, said z-axis 630 represents a magnetic compass direction.

FIG. 6c illustrates an example of said imaging system coordinate system according to yet another embodiment of the disclosure. In this embodiment, said z-axis 630 represents a target location (e.g., obtained using an orientation sensor 660) to which the user is trying to navigate the image-capturing unit 170. In FIG. 6c, a set of latitude/longitude coordinates are used to illustrate the target location, however the inventive concept is not limited to a coordinate and may be extended to any way of representing a target location known in the art by a skilled person.

Generating an Orientation-Adapted Image by Overlaying.

To improve a remote inspection system user's understanding of an image captured by an image device for remote inspection, orientation information may be represented as a visual representation, e.g. a symbol or geometrical object, and overlaid onto a visual representation of a captured image.

In one or more embodiments, generating an orientation-adapted image comprises overlaying a visual representation of orientation data values obtained from an orientation sensor (e.g., orientation sensor 150, 460, or 660, and/or other orientation sensor provided in image-capturing unit 170, image-presenting unit 180, or a user) onto a visual representation of a captured image.

In one or more embodiments, generating an orientation-adapted image comprises:
  rendering or generating a visual representation of a captured image;
  rendering or generating a visual representation of orientation data values obtained from an orientation sensor;

generating the orientation-adapted image based on said visual representation of a captured image and said visual representation of orientation data values, wherein said visual representation of orientation data values is overlaid said visual representation of a captured image.

In one non-limiting example, a visual representation of orientation data values in the form of vectors are overlaid onto a visual representation of a captured IR image.

Figure 7:
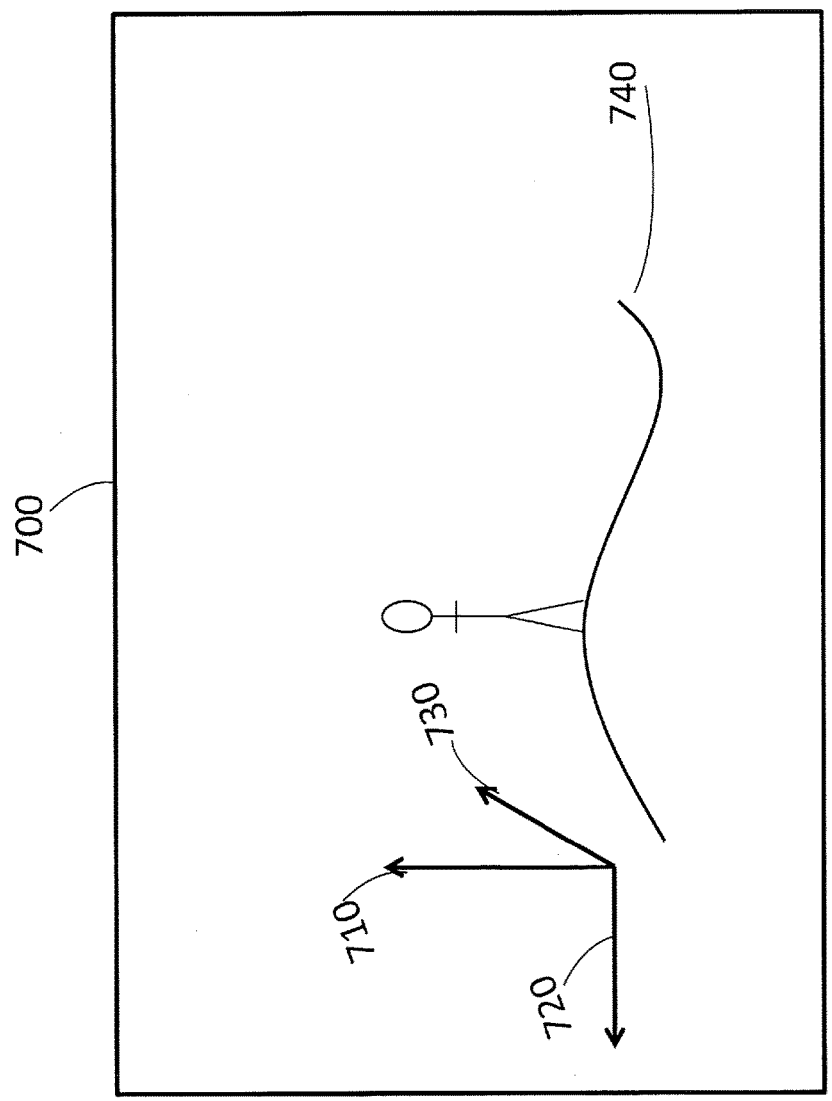
FIG. 7 illustrates an example of an orientation-adapted image that is generated by overlaying a visual representation of orientation data values in the form of vectors obtained from an orientation sensor onto a visual representation of a captured image, in accordance with an embodiment of the disclosure.

FIG. 7 shows an example of an orientation-adapted image 700 that is generated by overlaying a visual representation of orientation data values obtained from an orientation sensor (e.g., orientation sensor 150, 460, or 660, and/or other orientation sensor provided in image-capturing unit 170, image-presenting unit 180, or a user) onto a visual representation of a captured image, e.g. an IR image, in accordance with an embodiment of the disclosure. A visual representation of orientation data values obtained from an orientation sensor in the form of vectors is overlaid onto a visual representation of a captured image of an observed real world scene 740. In one or more embodiments, the visual representation of orientation data values is represented by a selection of: a vector 710 indicating a vertical or up/down orientation, a vector 720 indicating a horizontal or left/right orientation and a vector 730 indicating directional orientation. Said directional orientation might be a selection of an estimate of an optical axis of the imaging system, a magnetic compass direction, and/or a target location to which the user is trying to navigate the image-capturing unit. In FIG. 7, the visual representation of orientation data values obtained from an orientation sensor is represented by geometrical objects at a predetermined location, i.e. the lower left corner in said orientation-adapted image In one or more embodiments, said visual representation of orientation data values obtained from an orientation sensor is represented by geometrical objects at a predetermined location in said orientation-adapted image. In one non-limiting example, said visual representation of orientation data values are represented as vectors extending outwards from said predetermined location.

In one or more embodiments, said visual representation of orientation data values obtained from an orientation sensor is represented by one or a plurality of vectors extending from a predetermined location in said orientation-adapted image. In one example, said visual representation of orientation data values are represented by one or a plurality of vectors extending from a predetermined location, wherein the predetermined location is one of lower left corner, top left corner, lower right corner, top right corner or in the center of said orientation-adapted image.

Figure 8:
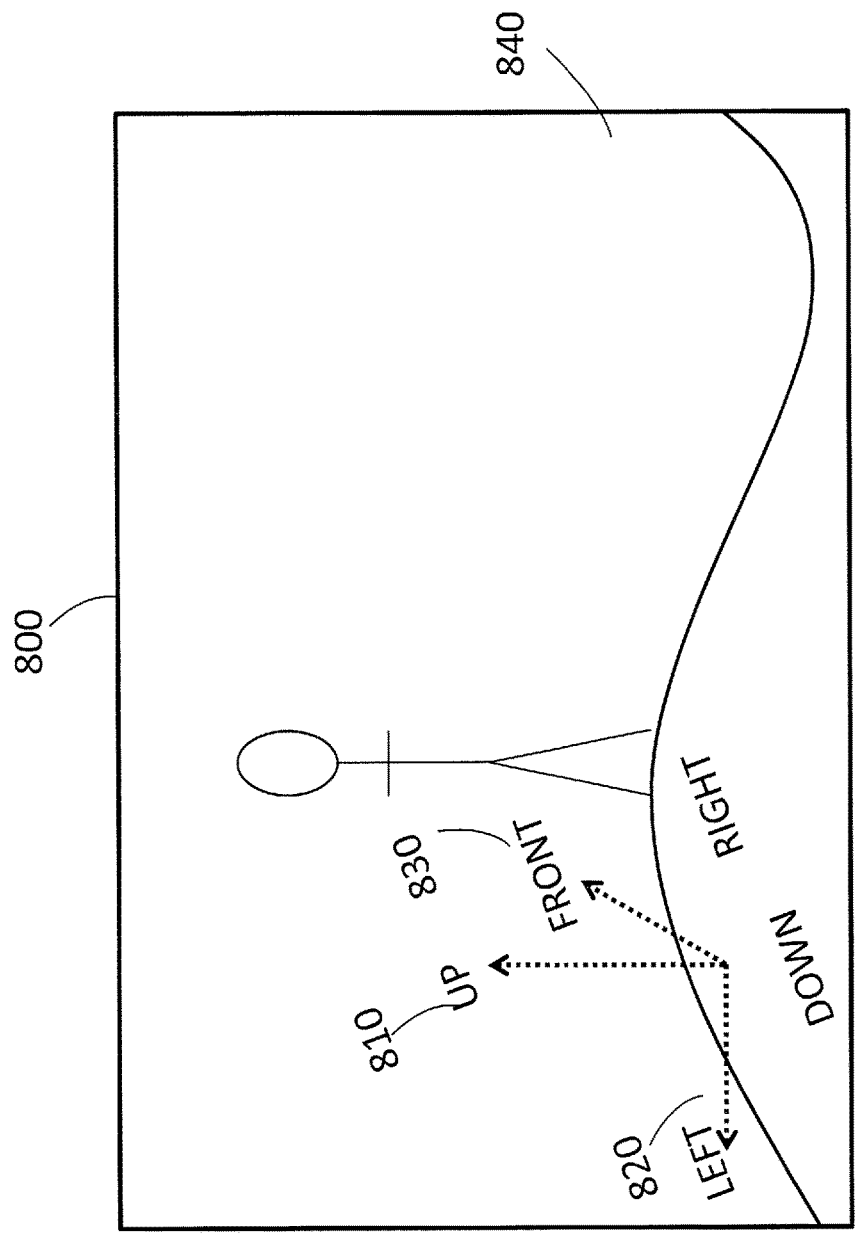
FIG. 8 illustrates an example of an orientation-adapted image that is generated by overlaying a visual representation of orientation data values, represented by alphanumerical symbols located at the end of a vector extending from a predetermined location in said orientation-adapted image, obtained from an orientation sensor onto a visual representation of a captured image, in accordance with an embodiment of the disclosure.

FIG. 8 shows an example of an orientation-adapted image 800 that is generated by overlaying a visual representation of orientation data values obtained from an orientation sensor (e.g., orientation sensor 150, 460, or 660, and/or other orientation sensor provided in image-capturing unit 170, image-presenting unit 180, or a user) onto a visual representation of a captured image of an observed real world scene 840, e.g. an IR image, in accordance with another embodiment of the disclosure. In one or more embodiments, said visual representation of orientation data values obtained from an orientation sensor is represented by alphanumerical symbols located at the end of a vector extending from a predetermined location in said orientation-adapted image. In one non-limiting example, said visual representation of orientation data values are represented by symbols, such as "UP" 810, "DOWN", "LEFT" 820, "RIGHT", "FRONT" or "TARGET" 830 located at the end point of a vector extending out from said predetermined location. Such vectors might be obtained, e.g., by transforming orthogonal x, y, and z axes vectors of a predetermined length so that the y-axis aligns with an vertical or up/down orientation of the imaging system coordinate system, the x-axis aligns with the x-axis of the imaging system coordinate system, and the z-axis aligns with the z-axis of the imaging system coordinate system. In FIG. 8, the visual representation of orientation data values obtained from an orientation sensor is represented by geometrical objects at a predetermined location, i.e. the lower left corner in said orientation-adapted image, as would be understood by a skilled person.

Figure 9:
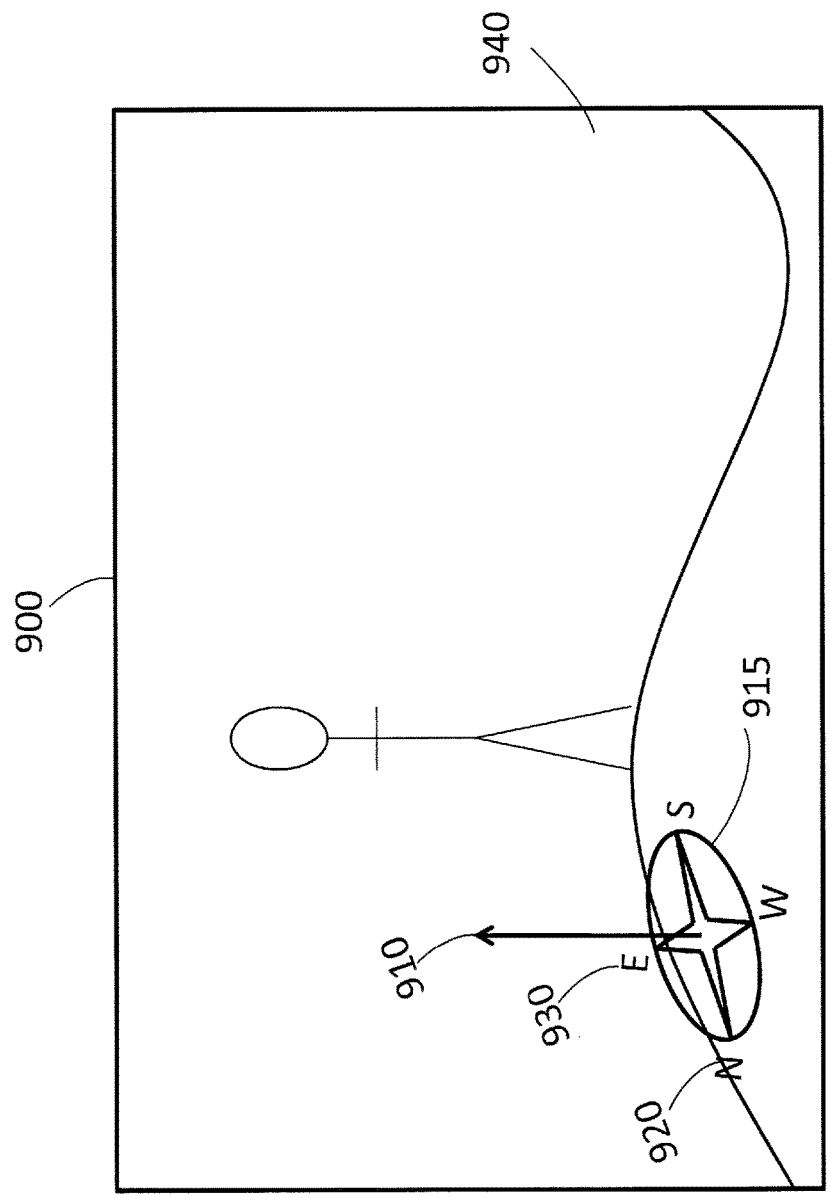
FIG. 9 illustrates an example of an orientation-adapted image where said visual representation of orientation data values obtained from an orientation sensor is represented by a vector and a compass rose, in accordance with an embodiment of the disclosure.

FIG. 9 shows an example of an orientation-adapted image 900 where said visual representation of orientation data values obtained from an orientation sensor is represented by a vector 910 and a compass rose 915 overlaid onto a visual representation of a captured image of an observed real world scene 940, in accordance with an embodiment of the disclosure. In this embodiment, the vector 910 aligns with a vertical or up/down orientation calculated based on orientation data values, and the compass rose aligns with a horizontal or left/right orientation 920 and a directional orientation or z-axis 930 based on orientation data values, as would be understood by a skilled person. In one or more embodiments, said directional orientation or z-axis 930 might be a selection of an estimate of an optical axis of the imaging system, a magnetic compass direction, and/or a target location to which the user is trying to navigate the image-capturing unit.

Generating an Orientation-Adapted Image by Physically Rotating Parts of the Image-Capturing Unit or Parts of the Image-Presenting Unit.

One of the problems of conventional systems is that a remote inspection system with a flexible tube or arm allows an image-capturing unit to be oriented in an arbitrary direction. In addition, an image-presenting unit may be oriented in an arbitrary direction. One or more embodiments of the disclosure address such problems by obtaining a reference coordinate system, such as the direction of gravity for the y-axis representing a vertical or up/down orientation, the horizontal plane orthogonal to the direction of gravity as an x-axis representing horizontal or left/right orientation, and a directional orientation as a z-axis, wherein said directional orientation might be a selection of an estimate of an optical axis of the imaging system, a magnetic compass direction, and/or a target location to which the user is trying to navigate the image-capturing unit. All or part of the image-capturing unit and/or all or part of the image-presenting unit is then rotated so that they align with the reference systems y-axis.

As described above with respect to FIG. 5b, said remote inspection system of FIG. 1 or remote inspection system 201 may further comprise image-capturing unit servo motor 520 according to one or more embodiments. In such embodiments, said processor unit 110, 250, and/or 312 may be configured to:
  obtain a reference coordinate system;
  determine an imaging system coordinate system based on obtained orientation data values and a calibrated location of the orientation sensor 150, 460, or 660;
  determine a vertical rotation offset between the reference coordinate system and said imaging system coordinate system; and
  send a control signal to said image-capturing unit servo motor 520 to rotate the imaging system 510 to minimize (e.g., reduce to a desired degree) said vertical rotation offset.

In one or more embodiments, only a detector (e.g., IR detector 260, VL detector 270, or other detector) of said imaging system is rotated.

In one non-limiting example, the direction of gravity is obtained as a y-axis representing a vertical or up/down orientation as a reference coordinate system. An image system coordinate system is determined by the processor unit based on said obtained orientation data values and a calibrated orientation sensor location represented by predetermined orientation data values. The orientation sensor providing said orientation data values may be a tilt sensor or accelerometer. The tilt sensor may be calibrated so that when the detector of the imaging system has a y-axis representing a vertical or up/down orientation parallel to the gravity direction, the orientation data values of the orientation sensor, in this case a tilt sensor, indicates a vertical rotation offset close to zero when determined by said processor, as would be understood by a skilled person. The vertical rotation offset of the imaging system may be determined based on the reference coordinate system and said imaging system coordinate system, in this case the gravity direction and the rotation of the imaging system indicated by said orientation sensor comprised in said imaging system. The processor unit is then configured to send a control signal to said image-capturing unit servo motor to rotate all or part of the imaging system to minimize (e.g., reduce to a desired degree) said vertical rotation offset. In one example, the servo motor is controlled to rotate in the opposite direction to the determined vertical rotation offset until the determined vertical rotation offset is below a predetermined threshold.

In one or more embodiments, said remote inspection system of FIG. 1 or remote inspection system 201 may further comprise an image-presenting unit servo motor, and an orientation sensor may be provided in the display system 120 of the image-presenting unit 180. In such embodiments, said processor unit 110, 250, and/or 312 may be configured to:

obtain a reference coordinate system;
determine a display system coordinate system based on obtained orientation data values and a calibrated location of the orientation sensor;
determine a vertical rotation offset between the reference coordinate system and said display system coordinate system; and
send a control signal to said image-presenting unit servo motor to rotate said display system to minimize said vertical rotation offset.

FIG. 10 illustrates how a display system 1010 is rotated by the image-presenting unit servo motor to minimize said vertical rotation offset, in accordance with an embodiment of the disclosure. In FIG. 10, a rotated display system 1020 represents the display system 1010 that has been rotated by the image-presenting unit servo motor to minimize or desirably reduce said vertical rotation offset. A reference coordinate system 1030 is obtained and a display system coordinate system is determined to determine a vertical rotation offset.

In one non-limiting example, the y-axis represents a vertical or up/down orientation of a reference coordinate system 1030, e.g. direction of gravity. A display system coordinate system 1040 is determined by the processor unit based on said obtained orientation data values and a calibrated location of the orientation sensor. The orientation sensor providing said orientation data values may be a tilt sensor or accelerometer. The tilt sensor may be calibrated so that when the detector of the display system has a y-axis, representing a vertical or up/down orientation, parallel to the gravity direction, the orientation data values of the orientation sensor, in this case a tilt sensor, indicates a vertical rotation offset equal to or close to zero when determined by said processor unit, as would be understood by a skilled person. The vertical rotation offset of the display system may be determined based on the reference coordinate system and said display system coordinate system, in this case the gravity direction and the rotation of the display system indicated by said orientation sensor comprised in said display system. The processor unit is configured to send a control signal to said image-presenting unit servo motor to rotate said display system to minimize (e.g., reduce to a desired degree) said vertical rotation offset. In one example, the servo motor is controlled to rotate in the opposite direction to the determined vertical rotation offset until the determined vertical rotation offset is below a predetermined threshold.

In yet another embodiment, an orientation-adapted image may be generated by physically rotating parts of the imaging system or the display system based on orientation data values, such as the entire imaging system, an image detector of the imaging system, the entire display system or just a display of the display system. In one non-limiting example, this might involve rotating the image detector or detectors while the optical system and control electronics remain in the same position. In yet another non-limiting example, this might involve rotating the display while the control electronics, such as the processor unit, remain in the same position.

Generating an Orientation-Adapted Image by Processing a Captured Image Based on Orientation Data Values from an Orientation Sensor.

As discussed, one of the problems of conventional systems is that a remote inspection system with a flexible tube or arm allows an image-capturing unit to be oriented in an arbitrary direction. In addition, an image-presenting unit may be oriented in an arbitrary direction. One or more embodiments of the present disclosure address such problems by obtaining a reference coordinate system, such as the direction of gravity for the y-axis representing a vertical or up/down orientation, the horizontal plane orthogonal to the direction of gravity as an x-axis representing horizontal or left/right orientation, and a directional orientation as a z-axis, wherein said directional orientation might be a selection of an estimate of the optical axis of the imaging system, a magnetic compass direction, and/or a target location to which the user is trying to navigate the image-capturing unit. The captured image is then image processed based on orientation data values from an orientation sensor (e.g., orientation sensor 150, 460, or 660, and/or other orientation sensor provided in image-capturing unit 170, image-presenting unit 180, or a user) so that the y-axis representing a vertical or up/down orientation of the captured image align with the reference systems y-axis.

In one or more embodiments, a method may include:
obtaining a reference coordinate system;
determining an imaging system coordinate system based on said obtained orientation data values and a calibrated location of the orientation sensor;
determining a vertical rotation offset between the reference coordinate system and said imaging system coordinate system; and
generating an orientation-adapted image based on said captured image and said orientation data values by image processing, wherein the image processing comprises performing a rotation transform based on a vertical rotation offset, wherein the rotation transform is performed in the opposite direction of the vertical rotation offset.

FIG. 11 illustrates an example of an orientation-adapted image 1120 that is generated by such image processing based on a captured image 1110 and orientation data values, in accordance with an embodiment of the disclosure.

In one or more embodiments, the processor unit 110, 250, and/or 312 may be is configured to:
  obtain a reference coordinate system;
  determine an display system coordinate system based on obtained orientation data values and a calibrated location of the orientation sensor;
  determine a vertical rotation offset between the reference coordinate system and said display system coordinate system; and
  generate an orientation-adapted image based on said captured image and said orientation data values by image processing, wherein the image processing comprises performing a rotation transform based on a vertical rotation offset, wherein the rotation transform is performed in the opposite direction of the vertical rotation offset.

In one or more embodiments, said processor unit 110, 250, and/or 312 may be configured to:
  obtain a reference coordinate system;
  determine a display system coordinate system based on obtained orientation data values and a calibrated location of a first orientation sensor;
  determine a first vertical rotation offset between the reference coordinate system and said display system coordinate system;
  determine an imaging system coordinate system based on obtained orientation data values and a calibrated location of a second orientation sensor;
  determine a second vertical rotation offset between the reference coordinate system and said imaging system coordinate system; and
  generate an orientation-adapted image based on said captured image and said orientation data values by image processing, wherein the image processing comprises:
    performing a rotation transform based on said first vertical rotation offset, wherein the rotation transform is performed in the opposite direction of the first vertical rotation offset; and
    performing a rotation transform based on said second vertical rotation offset, wherein the rotation transform is performed in the opposite direction of the second vertical rotation offset.

In one non-limiting example, the direction of gravity is obtained as a y-axis representing a vertical or up/down orientation of the reference coordinate system. The imaging system coordinate system is determined by the processor unit based on obtained orientation data values and a calibrated location (e.g., represented by predetermined orientation data values) of an orientation sensor fixed relative to and/or comprised in the imaging system. The display system coordinate system is determined by the processor unit based on obtained orientation data values and a calibrated location (e.g., represented by predetermined orientation data values) of an orientation sensor fixed relative to and/or comprised in the display system. The orientation sensors providing said orientation data values may be a tilt sensor or accelerometer. The tilt sensor may be calibrated so that when the detector of the imaging system or display system is has a y-axis representing a vertical or up/down orientation parallel to the gravity direction the orientation data values of the orientation sensor, in this case a tilt sensor, indicates a vertical rotation offset close to zero when determined by said processor unit, as would be understood by a skilled person.

The first vertical rotation offset of the display system may be determined based on the reference coordinate system and said display system coordinate system, in this case the gravity direction and the rotation of the display system indicated by said orientation sensor fixed relative to and/or comprised in said display system. The second vertical rotation offset of the imaging system may be determined based on the reference coordinate system and said imaging system coordinate system, in this case the gravity direction and the rotation of the imaging system indicated by said orientation sensor fixed relative to and/or comprised in said imaging system. The processor unit is configured to generate an orientation-adapted image based on said image data values and said captured image by performing an rotation image transform on the captured image in the opposite direction of the first vertical rotation offset and performing an rotation image transform on the transformed image in the opposite direction of the vertical rotation offset.

In another embodiment, generating the orientation-adapted image further comprises a selection of the image processing operations of rotation transformation, scaling transformation, cropping, and/or area selection. A rotation image transform is in this text to be understood as an image transformation in a plane or in space that describes the motion of a rigid body around a fixed point. Rotation transformations are isometric; they leave the distance between any two points unchanged after the transformation. A translation is in this text to be understood as an image transformation that moves every point a constant distance in a specified direction.

Generating an Orientation-Adapted Image by VL/IR Contrast Enhancement.

When capturing an IR image, the image is by nature noisy and low contrast. The user therefore my find it difficult to interpret the orientation of objects in the captured image, in particular with regards to edges and other distinguishable features. These distinguishable features of objects might be improved by combining contrast information or high frequency content of a VL image with a captured IR image.

As discussed above, in one or more embodiments, said remote inspection system may comprise an IR imaging system and a VL imaging system. For such embodiments, to generate an orientation-adapted image the processor unit may be configured to:
  receive a captured VL image;
  receive a captured IR image;
  align the IR image and the VL image;
  process the VL image by extracting the high spatial frequency content of the VL image; and
  combine the extracted high spatial frequency content of the captured VL image and the IR image into a combined captured image.

In one or more embodiments, the processor unit is further configured to:
  determine a resolution value of the IR imaging system;
  determine a resolution value of VL imaging system; and
  determine whether the VL image resolution value and the IR image resolution value are substantially the same.

In one or more embodiments, the processor is further configured to:
  process the IR image to reduce noise in and/or blur the IR image.

In one or more embodiments, the processor is further configured to:

add high-resolution noise to the combined image.

Details of contrast enhancement techniques may be further understood through examples provided in the section entitled "Combined images with contrast enhancement" below.

Processor.

In one or more embodiments, said processor unit comprised in said remote inspection system is configured with code portions configured to direct said processor unit to perform various operations and functions of the methods described herein. In one or more embodiments, the processor unit receives and processes the image data values or video frames received from the imaging system, and receives and processes the orientation data values obtained from said orientation sensor. In one or more embodiments, image data values, video data values and generated orientation-adapted images can be stored on an external data storage device, e.g. a USB flash drive, or transmitted by wireless technology and non-wireless connections to an external computer device for further processing and analysis. It is also contemplated for one or more embodiments to configure the remote inspection system to allow the user to turn on and off both the image-capturing unit and/or the display depending on the requirements of the situation.

Display System.

The captured image, e.g. an IR image or a VL image or a combined IR/VL image can after capturing be displayed on a display system, either in the remote inspection system or in a separate device such as a tablet computer, a laptop or a desktop computer in order to enable a user to analyze the result.

As thermal or IR images by nature are generally low contrast and noisy, the captured IR image may be subjected to various imaging processing in to improve the interpretability of the image before displaying it to a user. Examples of such image processing is correction with IR temperature calibration data parameters, low pass filtering, registration of multiple successive IR images and averaging to obtain a averaged IR image or any other IR image processing operation known to a person skilled in the art.

As infrared radiation is not visible to the human eye, there are no natural relations between the captured infrared (IR) image data values of each pixel in an IR image and greyscale or colors in a visual representation displayed on a display. Therefore, an information visualization process referred to as false color or pseudo color is used to map captured IR image data values of each pixel in an IR image to a palette used to present the corresponding pixel in a visual representation displayed on a display, e.g. using grey-scale or colors A palette is typically a finite set of color or grey-scale representations selected from a color model for the display of images, i.e. a pre-defined palette represents a finite set of grayscale or color values of a color model displayable on a display thereby making it visible to the human eye.

Mapping of captured IR image data values of each pixel in an IR image to a palette used to present the corresponding pixel displayed on a display is typically performed by applying a pre-determined relation, wherein said pre-determined relation describes a mapping from infrared image data values to said pre-defined palette.

The captured IR image is typically displayed to an intended user based on the captured IR image comprising IR image data values, IR temperature calibration data parameters, a predefined palette representing a finite set of grayscale or color values of a color model displayable on a display and a pre-determined relation describing a mapping from infrared image data values to said pre-defined palette.

Analyzing.

After capturing an image as image data values and obtaining orientation sensor data values from the orientation sensor, a visual representation of the orientation-adapted image might be generated.

The visual representation or orientation-adapted image may be displayed on a display system (e.g., display system 120), e.g. by the processor unit in the remote inspection system sending a display signal to a display, such as a display (e.g., display 220) integrated in the remote inspection system or to an external display (e.g., display 318) via a communications interface (e.g., communications interface 200 and/or 316).

The visual representation of the orientation-adapted image may be saved to a memory, e.g. by the processor unit in the remote inspection system sending data values indicative of a visual representation of a captured image to a memory or to an external memory via an external communications interface. The memory may be integrated in the remote inspection system or external and communicatively coupled to the remote inspection system. In one example, the memory might be a memory card inserted into the remote inspection system. In another example, the memory might be a memory (e.g., memory 315) in an external computing device (e.g., computing device 330) communicatively coupled to the remote inspection system via an external communications interface (e.g., communications interface 200 and/or 316).

3D Trace.

When operating the remote inspection system the user might find it difficult to return the image-capturing unit to a previously visited position, with the same field of view, to further analyze the scene. The user might therefore require assistance to navigate said image-capturing unit to a particular location. Thus, to provide such assistance, in various embodiment generating an orientation-adapted image may include generating a visual representation of historical coordinates of a current 3D location and overlaying onto a visual representation of a captured image.

In one or more embodiments, generating an orientation-adapted image further comprises:

estimating coordinates of a current 3D location of the imaging system based on said orientation data values; and storing said coordinates of a current 3D location to memory.

In one or more embodiments, said estimating coordinates of a current 3D location further comprises:

determining a current motion vector based on coordinates of a previous 3D location and said coordinates of a current 3D location; and storing said current motion vector to memory.

In one or more embodiments, generating an orientation-adapted image further comprises:

retrieving historical coordinates of a current 3D location from memory; and generating an orientation-adapted image based on said captured image and said orientation data values, wherein generating an orientation-adapted image further comprises generating a visual representation of historical coordinates of a current 3D location and overlaying onto a visual representation of a captured image.

Figure 12:
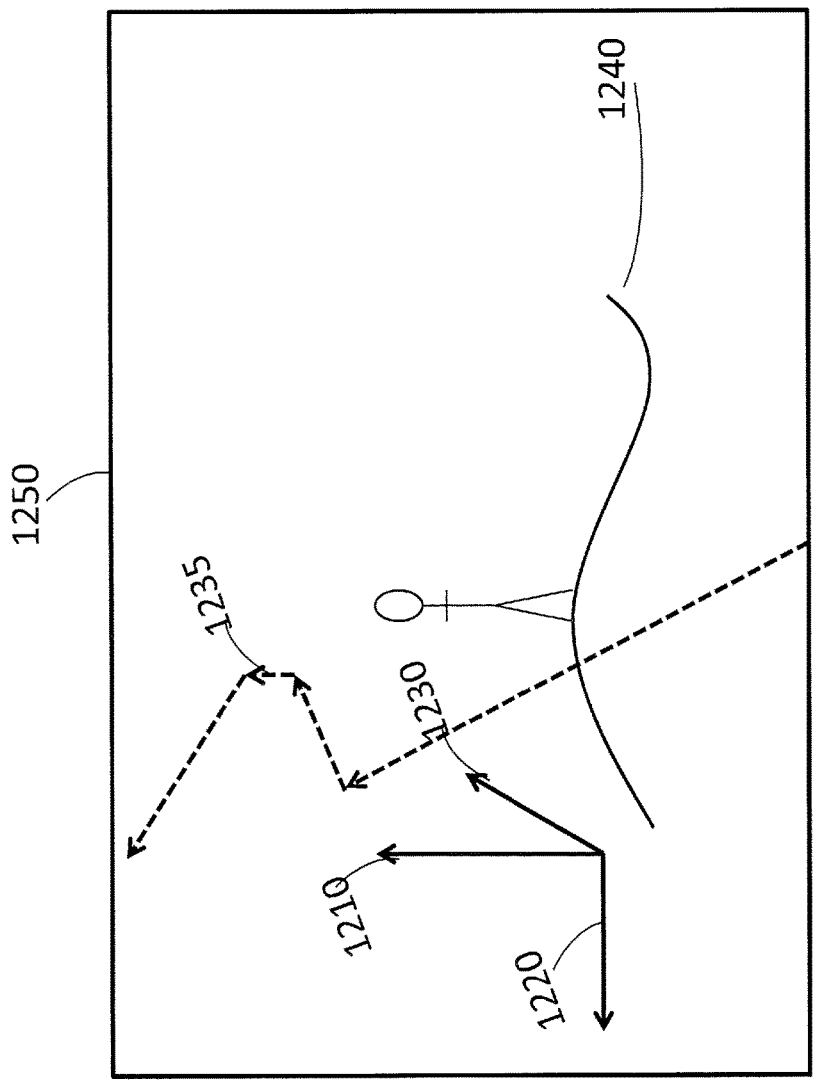
FIG. 12 illustrates an example of an orientation-adapted image that is generated by generating a visual representation of historical coordinates of a current 3D location and overlaying onto a visual representation of a captured image, in accordance with an embodiment of the disclosure.

FIG. 12 shows an example of an orientation-adapted image 1250 that is generated by generating a visual representation of historical coordinates 1235 of a current 3D location and overlaying onto a visual representation of a captured image of an observed real world scene 1240. As shown in the example of FIG. 12, vectors 1210, 1220, 1230 as visual representation of orientation data values may be generated and overlaid to generate the orientation-adapted image 1250, in a same or similar manner as described above for vectors 710, 720, 730 of FIG. 7. It should be appreciated that other visual representations of orientation data values, such as those described in connection with FIGS. 8 and 9, may be provided as desired for particular application or as selected by the user. It should also be appreciated that visual representation of orientation data values may be omitted from the orientation-adapted image 1250.

In one or more embodiments, the remote inspection system may be battery operated for a portable model and with a conventional power cord for a non-portable model.

In one or more embodiments, the remote inspection system comprises a memory card for saving images, videos and orientation sensor values captured by the image-capturing unit and orientation sensor. This saved data can be extracted into computer storage or a portable storage device for later observation through various forms of transfer known to a person skilled in the art. In one or more embodiments, a computer program product comprising computer readable code configured to, when executed in a processor, perform any or all of the method steps described herein.

In one or more embodiments, a non-transitory computer readable memory on which is stored computer readable code configured to, when executed in a processor, perform any or all of the method steps described herein.

Combined Images with Contrast Enhancement

As IR images are by nature low contrast and noisy, navigating an image-capturing unit based on a presented image might be a difficult task to a user of a remote inspection system. By generating an orientation-adapted image by combining a non-thermal image (e.g., including a visible light image) and an IR image, relevant features for navigation might be enhanced, such as edges and corners.

Figure 13:
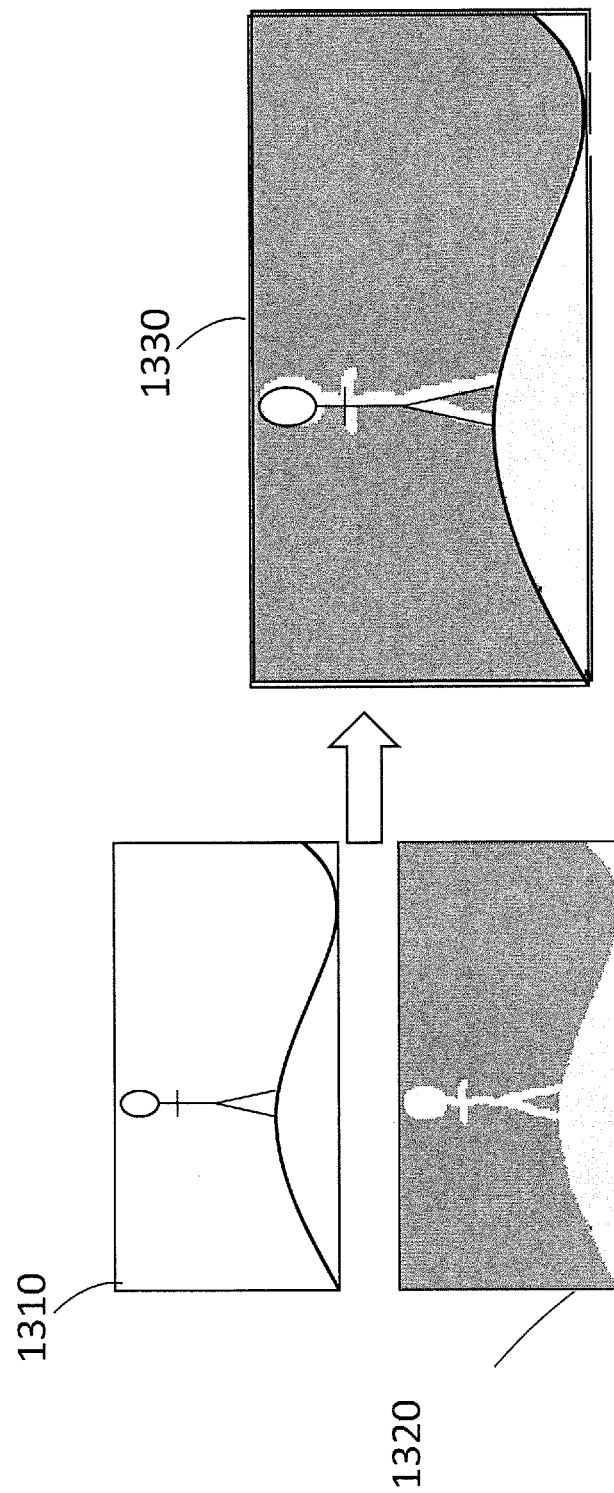
FIG. 13 illustrates an example of an orientation-adapted image that is generated based on a contrast enhanced image from combining a VL image and an IR image.

FIG. 13 shows an example of an orientation-adapted image 1330 that is generated based on a non-thermal image 1310 (e.g., a VL image) and an IR image 1320.

According to one embodiment, generating an orientation-adapted image further based on a combined image, of a non-thermal image and an IR image.

According to one embodiment, the combined image is a contrast-enhanced version of the IR image with addition of non-thermal image data.

According to one embodiment, a method for obtaining a combined image comprises aligning, determining that the non-thermal image resolution value and the IR image resolution value are substantially the same, and combining the IR image and the non-thermal image.

Aligning.

Since the capturing of an infrared (IR) image and capturing of a non-thermal image is generally performed by different imaging systems of the remote inspection system mounted in a way that the offset, direction and rotation around the optical axes differ. The optical axes between the imaging systems may be at a distance from each other and an optical phenomenon known as parallax distance error will arise. The optical axes between the imaging systems may be oriented at an angle in relation to each other and an optical phenomenon known as parallax pointing error will arise.

The rotation of the imaging systems around their corresponding optical axes and an optical phenomenon known as parallax rotation error will arise. Due to these parallax errors the captured view of the real world scene, called field of view (FOV) might differ between the IR imaging system (e.g., IR imaging system 285) and the non-thermal imaging system (e.g., VL imaging system 295).

Since the capturing of the infrared (IR) image and capturing of the non-thermal image is generally performed by different imaging systems of the remote inspection system with different optical systems with different properties, such as magnification, the captured view of the real world scene, called field of view (FOV) might differ between the imaging systems. The IR image and the non-thermal image might be obtained with different optical systems with different optical properties, such as magnification, resulting in different sizes of the FOV captured by the IR sensor and the VL sensor.

In order to combine the captured IR and captured non-thermal image the images must be adapted so that an adapted IR image and adapted non-thermal image represents the same part of the observed real world scene, in other words compensating for the different parallax errors and FOV size. This processing step is referred to as registration of or alignment of the IR image and the non-thermal image. Registration or alignment can be performed according to an appropriate technique as would be understood by a skilled person in the art.

Determining that the Non-Thermal Image Resolution Value and the IR Image Resolution Value are Substantially the Same.

In one embodiment, the IR image and the non-thermal image might be obtained with different resolution, i.e. different number of sensor elements of the imaging systems. In order to enable pixel wise operation on the IR and non-thermal image they need to be re-sampled to a common resolution. Re-sampling can be performed according to any method known to a skilled person in the art.

In one embodiment, the IR image is resampled to a first resolution and the non-thermal image are resampled to a second resolution, wherein the first resolution is a multiple of 2 times the second resolution or the second resolution is a multiple of 2 times the first resolution, thereby enabling instant resampling by considering every 2N pixels of the IR image or the non-thermal image.

Combining IR Image and Non-Thermal Image.

In one or more embodiments, an IR image and a non-thermal image is combined by combining an aligned IR image with high spatial frequency content of an aligned non-thermal image to yield a contrast enhanced combined image. The combination is performed through superimposition of the high spatial frequency content of the non-thermal image and the IR image, or alternatively superimposing the IR image on the high spatial frequency content of the non-thermal image. As a result, contrasts from the non-thermal image can be inserted into an IR image showing temperature variations, thereby combining the advantages of the two image types without losing clarity and interpretability of the resulting combined image.

Figure 14:
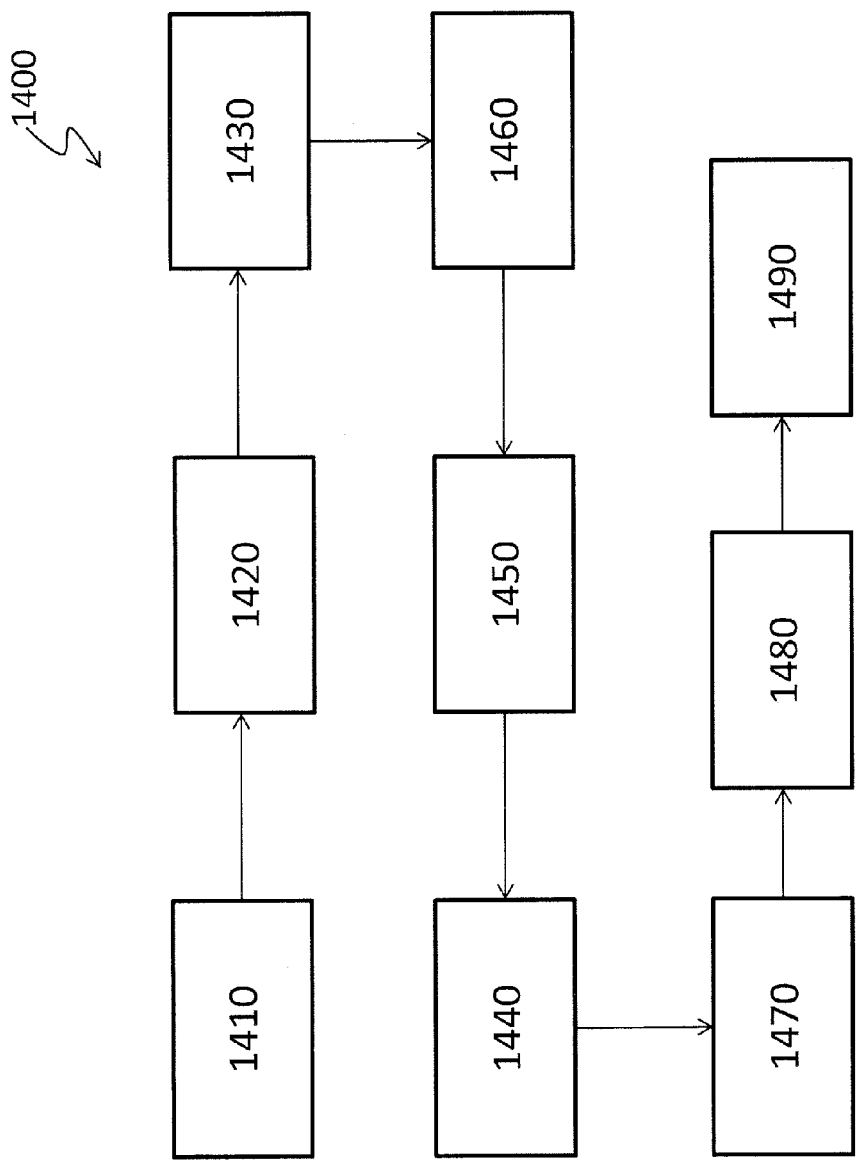
FIG. 14 shows a flowchart of a method to obtain a contrast enhanced combined image in accordance with an embodiment of the disclosure.

FIG. 14 illustrates a flowchart of an example of a method 1400 to obtain such a contrast enhanced combined image. Although the method 1400 is described below with respect to VL images, it should be appreciated that the method 1400 may be performed more generally using non-thermal images for one or more embodiments of the present disclosure.

Block 1410: Capturing VL Image.

In one example embodiment, capturing a VL image comprises capturing a VL image depicting the observed real world scene using the VL imaging system (e.g., VL imaging system 295) with an optical system (e.g., VL optical system 290) and sensor elements (e.g., VL detector 270), wherein the captured VL image comprises VL pixels of a visual representation of captured visible light image. Capturing a VL image can be performed according to one or more suitable techniques known to a skilled person in the art.

Block 1420: Capturing an IR Image.

In one example embodiment, capturing an IR image comprises capturing an IR image depicting an observed real world scene using the IR imaging system (e.g., IR imaging system 285) with an optical system (e.g., IR optical system 280) and sensor elements (e.g., IR detector 260), wherein the captured IR image comprises captured infrared data values of IR radiation emitted from the observed real world scene and associated IR pixels of a visual representation representing temperature values of the captured infrared data values. Capturing an IR image can be performed according to one or more suitable techniques known to a skilled person in the art.

In one embodiment, the operations of blocks 1410 and 1420 are performed simultaneously or one after the other. In one embodiment, the images may be captured at the same time or with as little time difference as possible, since this will decrease the risk for alignment differences due to movements of the remote inspection system unit capturing the visual and IR images. As is readily apparent to a person skilled in the art, images captured at time instances further apart may also be used if desired.

In one embodiment, the sensor elements of the IR imaging system and the sensor elements of the VL imaging system are substantially the same, e.g. have substantially the same resolution.

In another embodiment, the IR image may be captured with a very low-resolution IR remote inspection system, the resolution for instance being as low as 64×64 or 32×32 pixels, but many other resolutions are equally applicable, as is readably understood by a person skilled in the art. The inventor has found that if edge and contour (high spatial frequency) information is added to the combined image from the VL image, the use of a very low resolution IR image will still render a combined image where the user can clearly distinguish the depicted objects and the temperature or other IR information related to them. Capturing an IR image can be performed according to one or more suitable techniques known to a skilled person in the art.

Block 1430: Aligning the IR Image and the VL Image.

In one example embodiment, parallax error comprises parallax distance error between the optical axes that generally arises due to differences in placement of the sensors of the imaging systems for capturing said IR image and said VL image, the parallax pointing error angle created between these axes due to mechanical tolerances that generally prevents them being mounted exactly parallel and the parallax rotation error due to mechanical tolerances that generally prevents them being mounted exactly with the same rotation around the optical axis of the IR and VL imaging systems.

In one example embodiment, the capturing of the infrared (IR) image and capturing of the visible light (VL) image is performed by different imaging systems of the remote inspection system with different optical systems with different properties, such as magnification, the extent of the captured view of the real world scene, called size of field of view (FOV) might differ.

Aligning the IR image by compensating for parallax error and size of FOV to obtain an aligned IR image and an aligned VL image with substantially the same FOV can be performed according to one or more suitable techniques known to a skilled person in the art.

Block 1440: Determining a Resolution Value of the IR Imaging System and a Resolution Value of VL Imaging System, Wherein the Resolution Value of the IR Imaging System Corresponds to the Resolution of the Captured IR Image and the Resolution Value of VL Imaging System Corresponds to the Resolution of the Captured VL Image.

In one example embodiment, the resolution value represents the number of pixels in a row and the number of pixels in a column of a captured image. In one example embodiment, the resolutions of the imaging systems are predetermined.

Determining a resolution value of the IR imaging system and a resolution value of VL imaging system, wherein the resolution value of the IR imaging system corresponds to the resolution of the captured IR image and the resolution value of VL imaging system corresponds to the resolution of the captured VL image, can be performed according to one or more suitable techniques known to a skilled person in the art.

Block 1450: Determining that the VL Image Resolution Value and the IR Image Resolution Value are Substantially the Same.

In some embodiments, if in block 1450 it is determined that the VL image resolution value and the IR image resolution value are not substantially the same, the method 1400 may further involve re-sampling at least one of the received images so that the resulting VL image resolution value and the resulting IR image resolution value, obtained after re-sampling, are substantially the same.

In one embodiment, re-sampling comprises up sampling of the resolution of the IR image to the resolution of the VL image, determined in block 1440. In one embodiment, re-sampling comprises up sampling of the resolution of the VL image to the resolution of the IR image, determined in block 1440. In one embodiment, re-sampling comprises down sampling of the resolution of the IR image to the resolution of the VL image, determined in block 1440. In one embodiment, re-sampling comprises down sampling of the resolution of the VL image to the resolution of the IR image, determined in block 1440.

In one embodiment, re-sampling comprises re-sampling of the resolution of the IR image and the resolution of the VL image to an intermediate resolution different from the captured IR image resolution and the captured VL image resolution determined, in block 1440. In one example, the intermediate resolution is determined based on the resolution of a display unit of the thermography arrangement or remote inspection system.

According to one example embodiment, the operations of the method 1400 are performed for a portion of the IR image and a corresponding portion of the VL image. In one example, the corresponding portion of the VL image is the portion that depicts the same part of the observed real world scene as the portion of the IR image. In this embodiment, high spatial frequency content is extracted from the portion of the VL image, and the portion of the IR image is combined with the extracted high spatial frequency content of the portion of the VL image, to generate a combined image, wherein the contrast and/or resolution in the portion of the IR image is increased compared to the contrast of the originally captured IR image.

In other examples, said portion of the IR image may be the entire IR image or a sub portion of the entire IR image and said corresponding portion of the VL image may be the entire VL image or a sub portion of the entire VL image. In other words, according to one embodiment, the portions are the entire IR image and a corresponding portion of the VL image that may be the entire VL image or a subpart of the VL image if the respective IR and visual imaging systems have different fields of view.

Determining that the VL image resolution value and the IR image resolution value are substantially the same can be performed according to one or more suitable techniques known to a skilled person in the art.

Block 1460: Processing the VL Image by Extracting the High Spatial Frequency Content of the VL Image.

According to one embodiment, extracting the high spatial frequency content of the VL image is performed by high pass filtering the VL image using a spatial filter.

According to another embodiment, extracting the high spatial frequency content of the VL image is performed by extracting the difference (commonly referred to as a difference image) between two images depicting the same scene, where a first image is captured at one time instance and a second image is captured at a second time instance, preferably close in time to the first time instance. The two images may typically be two consecutive image frames in an image frame sequence. High spatial frequency content, representing edges and contours of the objects in the scene, will appear in the difference image unless the imaged scene is perfectly unchanged from the first time instance to the second, and the imaging sensor has been kept perfectly still. The scene may for example have changed from one frame to the next due to changes in light in the imaged scene or movements of depicted objects. In addition, in almost every case the remote inspection system or thermography system will not have been kept perfectly still.

A high pass filtering is performed for the purpose of extracting high spatial frequency content in the image, in other words locating contrast areas, i.e. areas where values of adjacent pixels display large differences, such as sharp edges. A resulting high pass filtered image can be achieved by subtracting a low pass filtered image from the original image, calculated pixel by pixel.

Processing the VL image by extracting the high spatial frequency content of the VL image can be performed according to other suitable techniques known to a skilled person in the art Block 1470: Processing the IR Image to Reduce Noise in and/or Blur the IR Image.

According to one embodiment, processing the IR image comprises reducing noise and/or blur the IR image is performed by a spatial low pass filter. Low pass filtering may be performed by placing a spatial core over each pixel of the image and calculating a new value for said pixel by using values in adjacent pixels and coefficients of said spatial core.

The purpose of the low pass filtering performed is to smooth out unevenness in the IR image from noise present in the original IR image captured at block 1420. Since sharp edges and noise visible in the original IR image are removed or at least diminished in the filtering process, the visibility in the resulting image is further improved through the filtering of the IR image and the risk of double edges showing up in a combined image where the IR image and the VL image are not aligned is reduced. In some embodiments, block 1470 may be omitted or optional.

Processing the IR image to reduce noise in and/or blur the IR image can be performed according to one or more suitable techniques known to a skilled person in the art.

Block 1480: Combining the Extracted High Spatial Frequency Content of the Captured VL Image and the Optionally Processed IR Image to a Combined Image.

In one embodiment, combining the extracted high spatial frequency content of the captured VL image and the optionally processed IR image to a combined image comprises using only the luminance component Y from the processed VL image. In another embodiment, combining the extracted high spatial frequency content of the captured VL image and the optionally processed IR image to a combined image comprises combining the luminance component of the extracted high spatial frequency content of the captured VL image with the luminance component of the optionally processed IR image.

As a result, in these embodiments the colors or greyscale of the IR image are not altered and the properties of the original IR palette maintained, while at the same time adding, the desired contrasts to the combined image. To maintain the IR palette through all stages of processing and display is beneficial, since the radiometry or other relevant IR information may be kept throughout the process and the interpretation of the combined image may thereby be facilitated for the user.

In one example, combining the extracted high spatial frequency content of the captured VL image and the optionally processed IR image to a combined image comprises combining the luminance component of the VL image with the luminance component of the IR image using a factor alpha to determine the balance between the luminance components of the two images when adding the luminance components. This factor alpha can be determined by the remote inspection system or imaging system itself, using suitable parameters for determining the level of contour needed from the VL image to create a satisfactory image, but can also be decided by a user by giving an input to the remote inspection system or imaging system. The factor can also be altered at a later stage, such as when images are stored in the system or in a PC or the like and can be adjusted to suit any demands from the user.

In another example, combining the extracted high spatial frequency content of the captured VL image and the optionally processed IR image to a combined image comprises using a palette to map colors to the temperature values of the IR image, for instance according to the YCbCr family of color spaces, where the Y component (i.e. the palette luminance component) may be chosen as a constant over the entire palette. In one example, the Y component may be selected to be 0.5 times the maximum luminance of the combined image, the VL image or the IR image. As a result, when combining the IR image according to the chosen palette with the VL image, the Y component of the processed VL image can be added to the processed IR image and yield the desired contrast without the colors of the processed IR image being altered. The significance of a particular nuance of color is thereby maintained during the processing of the original IR image.

When calculating the color components, the following equations can be used to determine the components Y, Cr and Cb for the combined image with the Y component from the processed, e.g. high pass filtered, VL image and the Cr and Cb components from the IR image $$hp\_y\_vis = highpass(y\_vis)$$

$$(y\_ir, cr\_ir, cb\_ir) = colored(lowpass(ir\_signal\_linear))$$

which in another notation would be written as:

$$hp_{y_{vis}} = highpass(y_{vis})$$

$$(y_{ir}, cr_{ir}, cb_{ir}) = colored(lowpass(ir_{signal\ linear}))$$

Other color spaces than YCbCr can, of course, also be used with embodiments of the present disclosure. The use of different color spaces, such as RGB, YCbCr, HSV, CIE 1931 XYZ or CIELab for instance, as well as transformation between color spaces is well known to a person skilled in the art. For instance, when using the RGB color model, the luminance can be calculated as the mean of all color components, and by transforming equations calculating a luminance from one color space to another, a new expression for determining a luminance will be determined for each color space.

Block 1490: Adding High Resolution Noise to the Combined Image.

According to one embodiment, the high resolution noise is high resolution temporal noise. High resolution noise may be added to the combined image in order to render the resulting image more clearly to the viewer and to decrease the impression of smudges or the like that may be present due to noise in the original IR image that has been preserved during the optional low pass filtering of said IR image.

According to various embodiments, the processor unit 110, 250, and/or 312 may be configured to perform all or part of blocks 1410-1490 of method 1400. There may be provided a user interface enabling the user to interact with the displayed data, e.g. on display 220 or 318. Such a user interface may comprise selectable options or input possibilities allowing a user to switch between different views, zoom in on areas of interest etc. In order to interact with the display, the user may provide input using one or more input devices (e.g., user input device 210 or 317).

According to an embodiment, a user may interact with the remote inspection system to perform zooming or scaling of one of the images, in manners known in the art, before storing or display of the images. If a user performs a zooming or scaling action on either the IR or the VL image, the FOV of the associated image may be adjusted according to various embodiments of the method described above with reference to FIG. 14 (e.g., in step 1430). Thus, the FOV of the associated images will always be matched, either in real-time or near real-time to a user viewing the images on site, or in image data stored for later retrieval.

It should be appreciated that the embodiments of method 1400 described herein are provided as examples, and that various operations and blocks of method 1400 may be reordered, combined, divided, omitted, or otherwise rearranged without departing from the scope and spirit of the present disclosure.

Furthermore, while various example embodiments of method 1400 are provided herein, combining the VL and IR images may be additionally or alternatively include various operations to superimpose, fuse, blend, or otherwise combine the VL and IR images as disclosed in, for example, U.S. Patent Application Nos. 61/748,018, 61/473,207, Ser. Nos. 12/766,739, 13/105,765, or 13/437,645, or International Patent Application No. PCT/EP2011/056432, all incorporated herein by reference.

Method Embodiments

As previously discussed, a user operating a remote inspection system will have problems interpreting a captured image by a remote image-capturing unit for the purpose of analyzing the image and navigating the image-capturing unit. In particular, rotations with regards to the captured image and the orientation of the user's eyes will cause, difficulties in analyzing the content of the image. Also the spatial orientation, such as an understanding of where the image-capturing unit current location is and how to navigate to a desired target location, may be difficult for the user to comprehend, in particular when operating in infrared mode where the images are low contrast and noisy.

One aspect of the present disclosure addresses such problems by generating an orientation-adapted image, thereby minimizing the rotation offset between the imaging systems vertical orientation and the presentation orientation. Another aspect of the disclosure addresses such problems by providing a visual representation of historic movements of the image-capturing unit and/or improving the understanding of the image-capturing units current location by improving contrast of features relevant for navigating the image-capturing unit, such as edges and corners.

According to various embodiments, a method may be performed to generate orientation-adapted images in an remote inspection system, wherein said remote inspection system comprises an image-capturing unit, an image-presenting unit, an orientation sensor, a processor and a imaging system comprised in said image-capturing unit. For example, the remote inspection system may correspond to various embodiments of the remote inspection system described herein with respect to FIG. 1 or remote inspection system 201, or other appropriate remote inspection systems. In various embodiments, the method may comprise:

capturing an image of a real world scene, wherein said image comprises a frame of image data values;

obtaining orientation data values from an orientation sensor; and generating an orientation-adapted image based on said image data values and said orientation data values.

Figure 15:
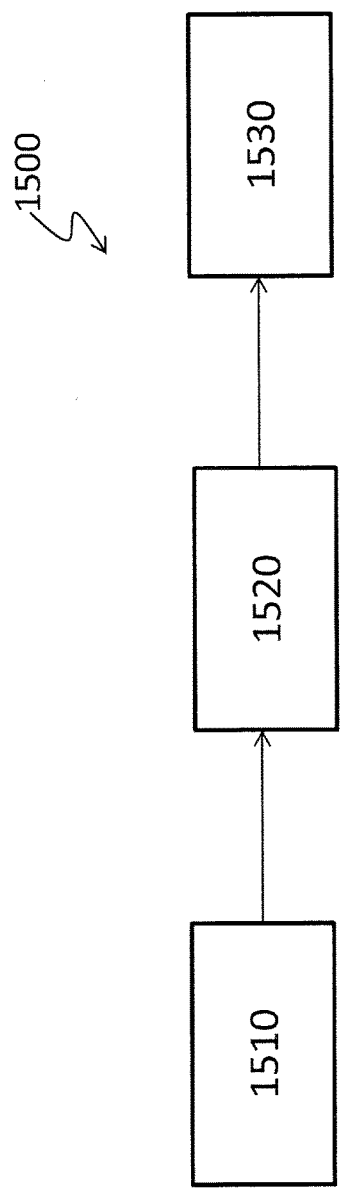
FIG. 15 shows a flowchart of a method to generate an orientation-adapted image in accordance with an embodiment of the disclosure.

FIG. 15 shows a flowchart of such a method 1500 according to an embodiment of the disclosure, where an orientation-adapted image is generated by capturing 1510 an image of a real world scene, obtaining 1520 orientation data values from an orientation sensor, and generating 1530 an orientation-adapted image based on said image and said orientation data values. Thus, for example, various embodiments of the method may improve a user's understanding of the captured image.

In one or more embodiments, said orientation sensor may be comprised in said imaging system. For these embodiments, said generating an orientation-adapted image may further comprise:

obtaining a reference coordinate system;

determining an imaging system coordinate system based on said obtained orientation data values and a calibrated location of the orientation sensor;

determining a vertical rotation offset between the reference coordinate system and said imaging system coordinate system; and generating an orientation-adapted image based on said captured image and said orientation data values by image processing, wherein the image processing comprises performing a rotation transform based on a vertical rotation offset, wherein the rotation transform is performed in the opposite direction of the vertical rotation offset.

In one or more embodiments, said remote inspection system may further comprise a display system comprised in said image-capturing unit, and said orientation sensor may be comprised in said display system. For these embodiments, said generating an orientation-adapted image may further comprise:

obtaining a reference coordinate system;
determining an display system coordinate system based on said obtained orientation data values and a calibrated location of the orientation sensor;
determining a vertical rotation offset between the reference coordinate system and said display system coordinate system; and
generating an orientation-adapted image based on said captured image and said orientation data values by image processing, wherein the image processing comprises performing a rotation transform based on a vertical rotation offset, wherein the rotation transform is performed in the opposite direction of the vertical rotation offset.

In one or more embodiments, said orientation sensor may be comprised in said imaging system. For these embodiments, said generating an orientation-adapted image may further comprise:
generating a visual representation of a captured image;
generating a visual representation of orientation data values obtained from an Orientation sensor; and
generating an orientation-adapted image based on said visual representation of a captured image and said visual representation of orientation data values, wherein said visual representation of orientation data values is overlaid onto said visual representation of a captured image.

In one or more embodiments, said visual representation of orientation data values is represented by geometrical objects at a predetermined location in said orientation-adapted image.

In one or more embodiments, said visual representation of orientation data values comprises one or a plurality of vectors extending from a predetermined location in said orientation-adapted image.

In one or more embodiments, said visual representation of orientation data values comprises alphanumerical symbols located at the end of a vector extending from a predetermined location in said orientation-adapted image.

In one or more embodiments, said visual representation of orientation data values comprises an arrow and a compass rose, wherein the arrow aligns with an vertical or up/down orientation calculated based on orientation data values and the compass rose aligns with a directional orientation based on orientation data values.

In one or more embodiments, said remote inspection system may further comprise an image-capturing unit servo motor, and said orientation sensor may be comprised in said imaging system. For these embodiments, said generating an orientation-adapted image may further comprise:
obtaining a reference coordinate system;
determining an imaging system coordinate system based on said obtained orientation data values and a calibrated location of the orientation sensor;
determining a vertical rotation offset between the reference coordinate system and said imaging system coordinate system; and
sending a control signal to said image-capturing unit servo motor to rotate the imaging system to minimize (e.g., substantially reduce or reduce to a desired extent) said vertical rotation offset.

In one or more embodiments, said remote inspection system may further comprise an image-presenting unit servo motor, and said orientation sensor may be comprised in said display system. For these embodiments, said generating an orientation-adapted image may further comprise:
obtaining a reference coordinate system;
determining a display system coordinate system based on said obtained orientation data values and a calibrated location of the orientation sensor;
determining a vertical rotation offset between the reference coordinate system and said display system coordinate system; and
sending a control signal to said image-presenting unit servo motor to rotate said display system to minimize said vertical rotation offset.

In one or more embodiments, said captured image comprises an infrared (IR) image. In one or more embodiments, said captured image comprises a visible light (VL) image.

In one or more embodiments, said imaging system may comprise an IR imaging system and a VL imaging system. For these embodiments, said generating an orientation-adapted image may further comprise:
receiving a captured VL image;
receiving a captured IR image;
aligning the IR image and the VL image;
processing the VL image by extracting the high spatial frequency content of the VL image; and
combining the extracted high spatial frequency content of the captured VL image and the IR image to a combined captured image, wherein the orientation-adapted image may be generated based on the combined captured image.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method of generating orientation-adapted images in a remote inspection system, the method comprising:
capturing an image of a scene by an image-capturing unit of the remote inspection system, wherein said image comprises a frame of image data values;
obtaining a first set of orientation data values from a first orientation sensor of the remote inspection system; and
generating an orientation-adapted image based on said image data values and said first set of orientation data values, wherein:
said remote inspection system comprises:
an image-presenting unit;
an image-presenting unit servo motor; and
a display system configured to display the generated orientation-adapted image, wherein said display system is comprised in said image-presenting unit, and wherein said first orientation sensor is comprised in said display system; and
said generating the orientation-adapted image comprises:
obtaining a reference coordinate system,
determining a display system coordinate system based on said obtained first set of orientation data values and a calibrated location of the first orientation sensor,
determining a first vertical rotation offset between the reference coordinate system and the display system coordinate system, and
sending a control signal to said image-presenting unit servo motor to rotate said display system to minimize the first vertical rotation offset.

2. The method of claim 1, wherein:
said image-capturing unit comprises an imaging system configured to capture the image of the scene;
said remote inspection system further comprises a second orientation sensor fixed relative to said imaging system; and
said generating the orientation-adapted image further comprises:
determining an imaging system coordinate system based on a second set of orientation data values and a position of the second orientation sensor relative to the imaging system,
determining a second vertical rotation offset between the reference coordinate system and said imaging system coordinate system, and
generating the orientation-adapted image based on said captured image and said first and second sets of orientation data values by image processing, wherein the image processing comprises performing a rotation transform based on the second vertical rotation offset, wherein the rotation transform is performed in the opposite direction of the second vertical rotation offset.

3. The method of claim 1, wherein:
said generating the orientation-adapted image further comprises:
generating the orientation-adapted image based on said captured image and said first set of orientation data values by image processing, wherein the image processing comprises performing a rotation transform based on the first vertical rotation offset, wherein the rotation transform is performed in the opposite direction of the first vertical rotation offset.

4. The method of claim 1, wherein:
said image-capturing unit comprises an imaging system configured to capture the image of the scene;
said remote inspection system further comprises a second orientation sensor comprised in said imaging system; and
said generating the orientation-adapted image further comprises:
generating a visual representation of the captured image,
generating a visual representation of a second set of orientation data values obtained from the second orientation sensor, and
generating the orientation-adapted image based on said visual representation of the captured image and said visual representation of the second set of orientation data values, wherein said visual representation of the second set of orientation data values is overlaid onto said visual representation of the captured image.

5. A remote inspection system comprising:
an image-capturing unit;
an imaging system comprised in said image-capturing unit and configured to capture an image of a scene, wherein the image comprises a frame of image data values;
an orientation sensor configured to determine orientation data values indicative of an orientation associated with the remote inspection system;
an image-capturing unit servo motor, wherein:
the orientation data values are indicative of an orientation associated with the imaging system; and
a processor configured to:
receive the image captured by the imaging system,
obtain the orientation data values from the orientation sensor,
generate an orientation-adapted image based on the image data values and the orientation data values,
obtain a reference coordinate system,
determine an imaging system coordinate system based on said obtained orientation data values and a position of the orientation sensor relative to the imaging system,
determine a vertical rotation offset between the reference coordinate system and said imaging system coordinate system, and
send a control signal to said image-capturing unit servo motor to rotate the imaging system to minimize said vertical rotation offset.

6. The method of claim 1, wherein said captured image comprises an infrared (IR) image.

7. The method of claim 1, wherein said captured image comprises a visible light (VL) image.

8. A method of generating orientation-adapted images in a remote inspection system, the method comprising:
capturing an image of a scene by an image-capturing unit of the remote inspection system, wherein said image comprises a frame of image data values;
obtaining orientation data values from an orientation sensor of the remote inspection system; and
generating an orientation-adapted image based on said image data values and said orientation data values,
wherein:
said image-capturing unit comprises a thermal imaging system configured to capture a thermal image of the scene and a non-thermal imaging system configured to capture a non-thermal image of the scene;
said captured image comprises the thermal image and the non-thermal image;
said generating the orientation-adapted image further comprises:
aligning the thermal image and the non-thermal image,
processing the non-thermal image by extracting high spatial frequency content of the non-thermal image, and
combining the extracted high spatial frequency content of the captured non-thermal image and the thermal image into a combined captured image; and said image data values are from the combined captured image.

9. A remote inspection system comprising:
an image-capturing unit;
an imaging system comprised in said image-capturing unit and configured to capture an image of a scene, wherein the image comprises a frame of image data values;
a first orientation sensor configured to determine a first set of orientation data values indicative of an orientation associated with the remote inspection system;
an image-presenting unit;
a display system configured to display an orientation-adapted image, wherein the display system is comprised in the image-presenting unit, wherein the first orientation sensor is comprised in said display system, and wherein the first set of orientation data values are indicative of an orientation associated with the display system; and
an image-presenting unit servo motor; and
a processor configured to:
  receive the image captured by the imaging system,
  obtain the first set of orientation data values from the first orientation sensor,
  generate the orientation-adapted image based on the image data values and the first set of orientation data values,
  obtain a reference coordinate system,
  determine a display system coordinate system based on the obtained first set of orientation data values and a calibrated location of the first orientation sensor,
  determine a first vertical rotation offset between the reference coordinate system and the display system coordinate system, and
  send a control signal to the image-presenting unit servo motor to rotate the display system to minimize the first vertical rotation offset.

10. The remote inspection system of claim 9, further comprising a second orientation sensor fixed relative to the imaging system, wherein:
a second set of orientation data values are indicative of an orientation associated with the imaging system; and
the processor is further configured to:
  determine an imaging system coordinate system based on said second set of orientation data values and a position of the second orientation sensor relative to the imaging system,
  determine a second vertical rotation offset between the reference coordinate system and said imaging system coordinate system, and
  generate the orientation-adapted image based on said captured image and said first and second sets of orientation data values by image processing, wherein the image processing comprises performing a rotation transform based on the second vertical rotation offset, wherein the rotation transform is performed in the opposite direction of the second vertical rotation offset.

11. The remote inspection system of claim 9, wherein:
the processor is further configured to:
  generate the orientation-adapted image based on said captured image and said first set of orientation data values by image processing, wherein the image processing comprises performing a rotation transform based on the first vertical rotation offset, wherein the rotation transform is performed in the opposite direction of the first vertical rotation offset.

12. The remote inspection system of claim 9, further comprising a second orientation sensor comprised in the imaging system, wherein:
a second set of orientation data values are indicative of an orientation associated with the imaging system; and
the processor is further configured to:
  generate a visual representation of the captured image,
  generate a visual representation of the second set of orientation data values obtained from the second orientation sensor, and
  generate the orientation-adapted image based on said visual representation of the captured image and said visual representation of the second set of orientation data values, wherein said visual representation of the second set of orientation data values is overlaid onto said visual representation of the captured image.

13. A method of generating orientation-adapted images in the remote inspection system according to claim 5, the method comprising:
  capturing the image of the scene by the image-capturing unit of the remote inspection system, wherein said image comprises the frame of image data values;
  obtaining the orientation data values from the orientation sensor of the remote inspection system; and
  generating the orientation-adapted image based on said image data values and said orientation data values,
wherein:
said image-capturing unit comprises the imaging system configured to capture the image of the scene;
said orientation sensor is fixed relative to said imaging system; and
said generating the orientation-adapted image further comprises:
  obtaining the reference coordinate system,
  determining the imaging system coordinate system based on said obtained orientation data values and the position of the orientation sensor relative to the imaging system,
  determining the vertical rotation offset between the reference coordinate system and said imaging system coordinate system, and
  sending the control signal to said image-capturing unit servo motor to rotate the imaging system to minimize said vertical rotation offset.

14. The remote inspection system of claim 9, wherein:
the imaging system comprises an infrared (IR) imaging system configured to capture an IR image of the scene; and
the image comprises the IR image.

15. The remote inspection system of claim 9, wherein:
the imaging system comprises a visible light (VL) imaging system configured to capture a VL image of the scene; and
the image comprises the VL image.

16. A remote inspection system comprising:
an image-capturing unit;
an imaging system comprised in said image-capturing unit and configured to capture an image of a scene, wherein the image comprises a frame of image data values;
an orientation sensor configured to determine orientation data values indicative of an orientation associated with the remote inspection system; and
a processor configured to:
  receive the image captured by the imaging system,
  obtain the orientation data values from the orientation sensor, and generate an orientation-adapted image based on the image data values and the orientation data values, wherein:

the imaging system comprises a thermal imaging system configured to capture a thermal image of the scene and a non-thermal imaging system configured to capture a non-thermal image of the scene;

the image comprises the thermal image and the non-thermal image;

the processor is further configured to:

align the thermal image and the non-thermal image, process the non-thermal image by extracting high spatial frequency content of the non-thermal image, and combine the extracted high spatial frequency content of the captured non-thermal image and the thermal image into a combined captured image; and the image data values are from the combined captured image.

17. A non-transitory machine-readable medium on which is stored machine-readable code which, when executed by the processor of the remote inspection system according to claim 9, cause the processor to perform a method comprising:

receiving the image of the scene captured by the image-capturing unit of the remote inspection system, wherein the image comprises the frame of image data values;

obtaining the first set of orientation data values from the first orientation sensor of the remote inspection system, wherein the first orientation sensor is configured to determine a rotation of the image-capturing unit relative to the scene; and generating the orientation-adapted image based on the image data values and the first set of orientation data values.

18. The non-transitory machine-readable medium of claim 17, wherein:

said remote inspection system further comprises a second orientation sensor fixed relative to said imaging system; and said generating the orientation-adapted image further comprises:

obtaining the reference coordinate system, determining an imaging system coordinate system based on a second set of orientation data values and a position of the second orientation sensor relative to the imaging system, determining a second vertical rotation offset between the reference coordinate system and said imaging system coordinate system, and generating the orientation-adapted image based on said captured image and said first and second sets of orientation data values by image processing, wherein the image processing comprises performing a rotation transform based on the second vertical rotation offset, wherein the rotation transform is performed in the opposite direction of the second vertical rotation offset.

* * * * *